United States Patent
Harvey

(10) Patent No.: US 9,817,607 B1
(45) Date of Patent: Nov. 14, 2017

(54) OPTIMIZATIONS TO AVOID INTERSOCKET LINKS

(71) Applicant: EMC IP Holding Company LLC, Hopkinton, MA (US)

(72) Inventor: David W. Harvey, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 144 days.

(21) Appl. No.: 14/310,179

(22) Filed: Jun. 20, 2014

(51) Int. Cl.
*G06F 12/00* (2006.01)
*G06F 3/06* (2006.01)

(52) U.S. Cl.
CPC .............. *G06F 3/065* (2013.01); *G06F 3/061* (2013.01); *G06F 3/0689* (2013.01)

(58) Field of Classification Search
CPC ......... G06F 3/065; G06F 3/061; G06F 3/0689
See application file for complete search history.

(56) References Cited

U.S. PATENT DOCUMENTS

| | | | | |
|---|---|---|---|---|
| 2003/0009631 A1* | 1/2003 | Arimilli | .............. | G06F 12/0817 711/135 |
| 2009/0254721 A1* | 10/2009 | Suzuki | ................ | G06F 11/1471 711/162 |
| 2011/0161980 A1* | 6/2011 | English | ................ | G06F 9/5083 718/105 |

OTHER PUBLICATIONS

U.S. Appl. No. 14/041,988, filed Sep. 30, 2013, O'Brien, et al.

* cited by examiner

*Primary Examiner* — Gurtej Bansal
(74) *Attorney, Agent, or Firm* — Muirhead and Saturnelli, LLC

(57) ABSTRACT

Described are techniques for processing read and write requests in a system having a NUMA (non-uniform memory access) configuration. Such techniques may include receiving, at a front end adapter of the system, a write request, to write first data to a first storage device, storing a first copy of the first data in first memory local to a first domain, copying, using a first inter-storage processor communication connection, the first data from the first memory to a third memory of a third domain thereby creating a second copy of the first data in the third memory; and determining, in accordance with a first heuristic and first criteria, whether to use the first copy of the first data stored in the first memory or the second copy of the first data stored in the third memory as a source when writing the first data to the first storage device.

21 Claims, 19 Drawing Sheets

OPTIMIZATIONS TO AVOID INTERSOCKET LINKS

BACKGROUND

Technical Field

This application relates to techniques used in connection with storage systems, and in particular, to storage systems having a NUMA (non-uniform memory access) configuration.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

SUMMARY OF THE INVENTION

In accordance with one aspect of the invention is a method of processing read and write requests comprising: receiving a write request at a first front end adapter of a data storage system, wherein the write request includes writing first data to a first storage device, wherein the data storage system includes a first storage processor, a second storage processor, a first inter-storage processor communication connection and a second inter-storage processor communication connection, the first storage processor comprising a first domain, a second domain and a first interdomain communication connection, the first domain including a first group of one or more CPUs, a first memory, the first front end adapter and a first backend adapter whereby the first memory, the first front end adapter and the first backend adapter are connected to the first group of one or more CPUs in a non-uniform memory access configuration, the second domain including a second group of one or more CPUs, a second memory, a second front end adapter and a second backend adapter whereby the second memory, the second front end adapter and the second backend adapter are connected to the second group of one or more CPUs in a non-uniform memory access configuration, wherein the first interdomain communication connection is between the first domain and the second domain and is used by the first domain to access the second memory and by the second domain to access the first memory, the second storage processor comprising a third domain, a fourth domain and a second interdomain communication connection, the third domain including a third group of one or more CPUs, a third memory, a third front end adapter and a third backend adapter whereby the third memory, the third front end adapter and the third backend adapter are connected to the third group of one or more CPUs in a non-uniform memory access configuration, the fourth domain including a fourth group of one or more CPUs, a fourth memory, a fourth front end adapter and a fourth backend adapter whereby the fourth memory, the fourth front end adapter and the fourth backend adapter are connected to the fourth group of one or more CPUs in a non-uniform memory access configuration, wherein the second interdomain communication connection is between the third domain and the fourth domain and is used by the third domain to access the fourth memory and by the fourth domain to access the third memory, wherein the first inter-storage processor communication connection is between the first domain socket and the third domain and allows communications therebetween including transferring data between the first memory and the third memory, and wherein the second inter-storage processor communication connection is between the second domain and the fourth domain and allows communications therebetween including transferring data between the second memory and the fourth memory, wherein the first storage device is connected to a set of disk adapters used to access the first storage device, the set of disk adapters including either the second disk adapter and the third disk adapter or otherwise includes the first disk adapter and the fourth disk adapter; storing a first copy of the first data in the first memory local to the first domain; copying, using the first inter-storage processor communication connection, the first data from the first memory to the third memory of the third domain thereby creating a second copy of the first data in the third memory; and determining, in accordance with a first heuristic and first one or more criteria, whether to use the first copy of the first data stored in the first memory or the second copy of the first data stored in the third memory as a source when writing the first data to the first storage device. The step of determining whether to use the first copy or the second copy of the first data may use the first one or more criteria that may include determining whether writing the first copy to the first storage device uses any of the first domain communication connection and the second interdomain communication connection. The step of determining may use the first heuristic that includes selecting the first copy to use as said source if none of the first interdomain communication connection and the second interdomain communication connection are used to write the first copy of data to the first storage device, and otherwise selecting the second copy, and wherein the method may further include writing the first data to the first storage device using either the first copy or the second copy as selected by said selecting. The step of determining whether to use the first copy or the second copy of the first data may use the first one or more criteria that includes determining whether writing the second copy to the first storage device uses any of the first interdomain communication connection and the second interdomain communication connection. The step of determining may use the first heuristic that includes selecting the second copy to use as said source if none of the first interdomain communication connection and the second interdomain communication connection are used to write the second copy of data to the first storage device, and otherwise selecting the first copy, and wherein the method may further comprise writing the first data to the first storage device using either the first copy or the second copy as selected by said selecting. The set of disk adapters may include the second disk adapter and the third disk adapter and may not include the first disk adapter and the fourth disk adapter and wherein said second copy of the third memory may be used as the source, and the method may further comprise using the third disk adapter to write the second copy of the first data from the third memory to the first storage device. The set of disk adapters may include the first disk adapter and the fourth disk adapter and may not include the second disk adapter and the third disk adapter and wherein the first copy of the first memory may be used as the source and the method may comprise using the fourth disk adapter to write the first copy of the first data from the first memory to the first storage device. The method may further comprise receiving a read request from a client at the first front end adapter, wherein processing for the read request includes reading second data from the first storage device; selecting, in accordance with a second heuristic and second one or more criteria, one disk adapter of the set of disk adapters to use when reading the second data from the first storage device; reading the second data from the first storage device using the one disk adapter; transferring the second data to the first domain whereby the second data is stored in the first memory; and sending, by the front end adapter, the second data in the first memory to the client. The step of selecting may use the second heuristic that selects the one disk adapter based on a current workload associated with any of the first interdomain communication connection and the second interdomain communication connection. The second one or more criteria may include a maximum number of allowable outstanding read operations on one or more interdomain communication connections. The first group of one or more CPUs, the second group of one or more CPUs, the third group of one or more CPUs and the fourth group of one or more CPUs may be included, respectively, in a first CPU socket, a second CPU socket, a third CPU socket, and a fourth CPU socket. The first interdomain communication connection may be a first intersocket communication connection and the second interdomain communication connection may be a second intersocket communication connection. The first storage processor may include a first set of four CPU sockets and the second storage processor may include a second set of four CPU sockets, wherein each of the sockets in the first set and the second set may include a group of one or more CPUs connected to a memory, a disk adapter and a front end adapter all local to said each socket in a non-uniform memory access configuration, wherein each of the four sockets in the first set may be connected to each of the remaining three sockets of the first set by an intersocket communication connection and each of the four sockets in the second set may be connected to each of the remaining three sockets of the second set by an intersocket communication connection, and wherein there may be an inter-storage processor communication connection between pairs of corresponding sockets whereby each of the pairs includes one socket of the first storage processor connected to another corresponding socket of the second storage processor.

In accordance with another aspect of the invention is a non-transitory computer readable medium comprising code stored thereon for processing read and write requests, the non-transitory computer readable medium comprising code stored thereon that, when executed by a processor, performs a method comprising: receiving a write request at a first front end adapter of a data storage system, wherein the write request includes writing first data to a first storage device, wherein the data storage system includes a first storage processor, a second storage processor, a first inter-storage processor communication connection and a second inter-storage processor communication connection, the first storage processor comprising a first domain, a second domain and a first interdomain communication connection, the first domain including a first group of one or more CPUs, a first memory, the first front end adapter and a first backend adapter whereby the first memory, the first front end adapter and the first backend adapter are connected to the first group of one or more CPUs in a non-uniform memory access configuration, the second domain including a second group of one or more CPUs, a second memory, a second front end adapter and a second backend adapter whereby the second memory, the second front end adapter and the second backend adapter are connected to the second group of one or more CPUs in a non-uniform memory access configuration, wherein the first interdomain communication connection is between the first domain and the second domain and is used by the first domain to access the second memory and by the second domain to access the first memory, the second storage processor comprising a third domain, a fourth domain and a second interdomain communication connection, the third domain including a third group of one or more CPUs, a third memory, a third front end adapter and a third backend adapter whereby the third memory, the third front end adapter and the third backend adapter are connected to the third group of one or more CPUs in a non-uniform memory access configuration, the fourth domain including a fourth group of one or more CPUs, a fourth memory, a fourth front end adapter and a fourth backend adapter whereby the fourth memory, the fourth front end adapter and the fourth backend adapter are connected to the fourth group of one or more CPUs in a non-uniform memory access configuration, wherein the second interdomain communication connection is between the third domain and the fourth domain and is used by the third domain to access the fourth memory and by the fourth domain to access the third memory, wherein the first inter-storage processor communication connection is between the first domain socket and the third domain and allows communications therebetween including transferring data between the first memory and the third memory, and wherein the second inter-storage processor communication connection is between the second domain and the fourth domain and allows communications therebetween including transferring data between the second memory and the fourth memory, wherein the first storage device is connected to a set of disk adapters used to access the first storage device, the set of disk adapters including either the second disk adapter and the third disk adapter or otherwise includes the first disk adapter and the fourth disk adapter; storing a first copy of the first data in the first memory local to the first domain; copying, using the first inter-storage processor communication connection, the first data from the first memory to the third memory of the third domain thereby creating a second copy of the first data in the third memory; and determining, in accordance with a first heuristic and first one or more criteria, whether to use the first copy of the first data stored in the first memory or the second copy of the first data stored in the third memory as a source when writing the first data to the first storage device.

In accordance with another aspect of the invention is a system comprising: a first storage processor including: a first CPU socket and a second CPU socket; a first memory connected to the first CPU socket and a second memory connected to the second CPU socket; a first front end adapter connected to the first CPU socket and a second front end adapter connected to the second CPU socket; a first disk adapter connected to the first CPU socket and a second disk adapter connected to the second CPU socket, wherein the first memory, the first front end adapter and the first disk adapter are local to the first CPU socket, and the second memory, the second front end adapter and the second disk adapter are local to the second CPU socket in a non-uniform memory access configuration; and a first intersocket communication connection between the first CPU socket and the second CPU socket configured to enable the first CPU socket to access the second memory and the second CPU socket to access the first memory; a second storage processor including: a third CPU socket and a fourth CPU socket; a third memory connected to the third CPU socket and a fourth memory connected to the fourth CPU socket; a third front end adapter connected to the third CPU socket and a fourth front end adapter connected to the fourth CPU socket; a third disk adapter connected to the third CPU socket and a fourth disk adapter connected to the fourth CPU socket, wherein the third memory, the third front end adapter and the third disk adapter are local to the third CPU socket, and the fourth memory, the fourth front end adapter and the fourth disk adapter are local to the fourth CPU socket in a non-uniform memory access configuration; and a second inter-socket communication connection between the third CPU socket and the fourth CPU socket configured to enable the third CPU socket to access the fourth memory and the fourth CPU socket to access the second memory; a first inter-storage processor communication connection between the first CPU socket and the third CPU socket configured to enable the first CPU socket and the third CPU socket to transfer data between the first memory and the third memory; a second inter-storage processor communication connection between the second CPU socket and the fourth CPU socket configured to enable the second CPU socket and the fourth CPU socket to transfer data between the second memory and the fourth memory; and a storage device accessible through a set of disk adapters, wherein said set of disk adapters includes either the second disk adapter and the third disk adapter or includes the first disk adapter and the fourth disk adapter. The system may include a non-transitory computer readable medium with code stored thereon that, when executed by a processor, performs a method comprising: receiving a write request at the first front end adapter; storing a first copy of the first data in the first memory local to the first CPU socket; copying, using the first inter-storage processor communication connection, the first data from the first memory to the third memory thereby creating a second copy of the first data in the third memory; determining, in accordance with a first heuristic and first one or more criteria, whether to use the first copy of the first data stored in the first memory or the second copy of the first data stored in the third memory as a source when writing the first data to the first storage device. The step of determining may use the first heuristic that may include selecting the first copy to use as said source if none of the first intersocket communication connection and the second intersocket communication connection are used to write the first copy of data to the first storage device, and otherwise selecting the second copy, and wherein the method may comprise writing the first data to the first storage device using either the first copy or the second copy as selected by said selecting. The set of disk adapters may include the second disk adapter and the third disk adapter and may not include the first disk adapter and the fourth disk adapter and wherein said second copy of the third memory may be used as the source, and the method may include using the third disk adapter to write the second copy of the first data from the third memory to the first storage device. The set of disk adapters may include the first disk adapter and the fourth disk adapter and may not include the second disk adapter and the third disk adapter and wherein the first copy of the first memory may be used as the source and the method may comprise using the fourth disk adapter to write the first copy of the first data from the first memory to the first storage device. The method may also include receiving a read request from a client at the first front end adapter, wherein processing for the read request includes reading second data from the first storage device; selecting, in accordance with a second heuristic and second one or more criteria, one disk adapter of the set of disk adapters to use when reading the second data from the first storage device; reading the second data from the first storage device using the one disk adapter; transferring the second data to the first domain whereby the second data is stored in the first memory; and sending, by the front end adapter, the second data in the first memory to the client, and wherein said selecting selects the one disk adapter based on a current workload associated with any of the first intersocket communication connection and the second intersocket communication connection.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
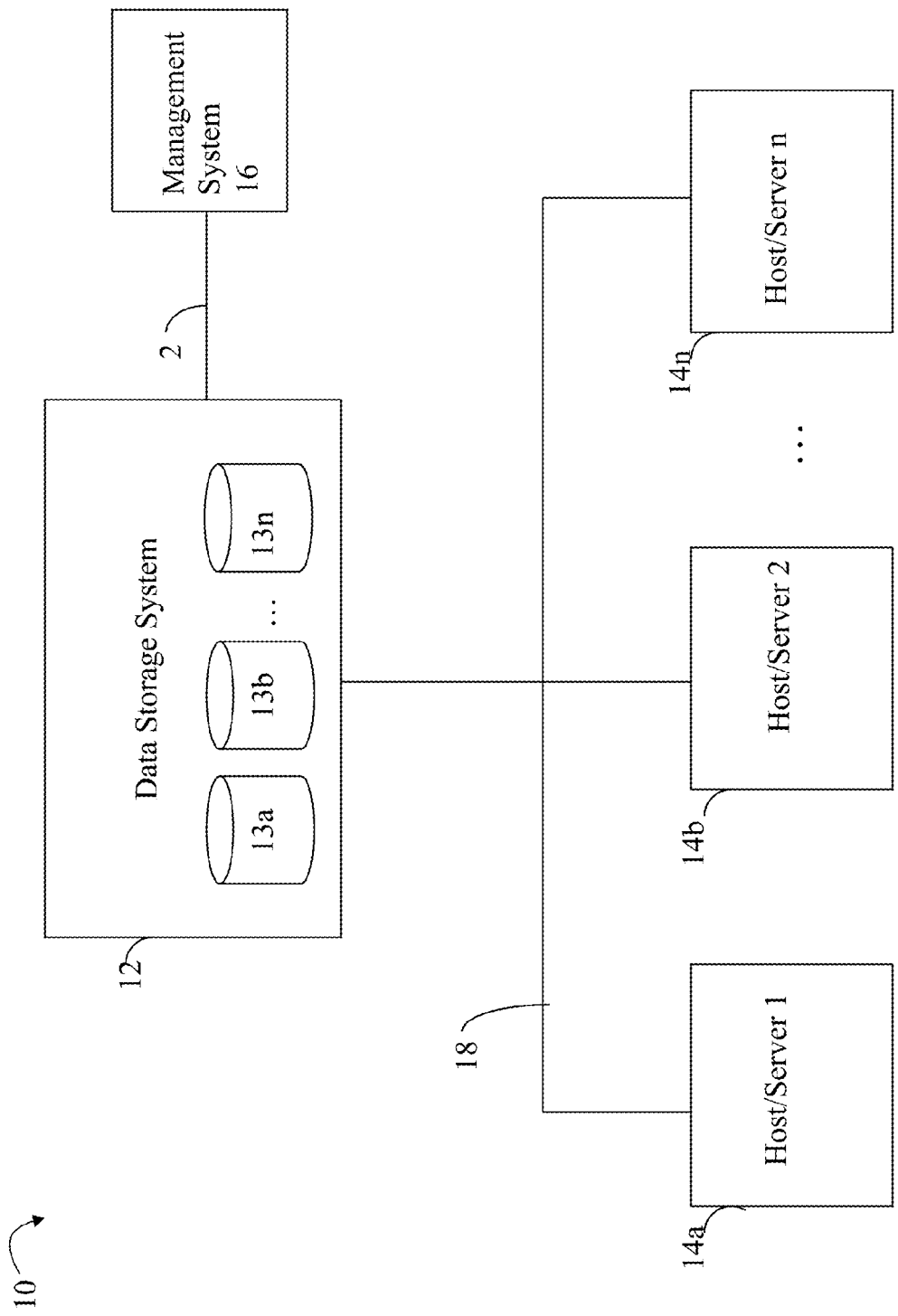
FIGS. 1 and 2 are examples of embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12. In an embodiment having multiple data storage systems, a first data storage system may also issue reads and/or writes to a second data storage system.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. A logical unit (LUN) may be characterized as a disk array or data storage system reference to an amount of disk space that has been formatted and allocated for use to one or more hosts. A logical unit may have a logical unit number that is an I/O address for the logical unit.

As used herein, a LUN or LUNs may refer to the different logical units of storage which may be referenced by such logical unit numbers. An LV or LUN may be used to refer to the foregoing logically defined devices or volumes.

Figure 2:
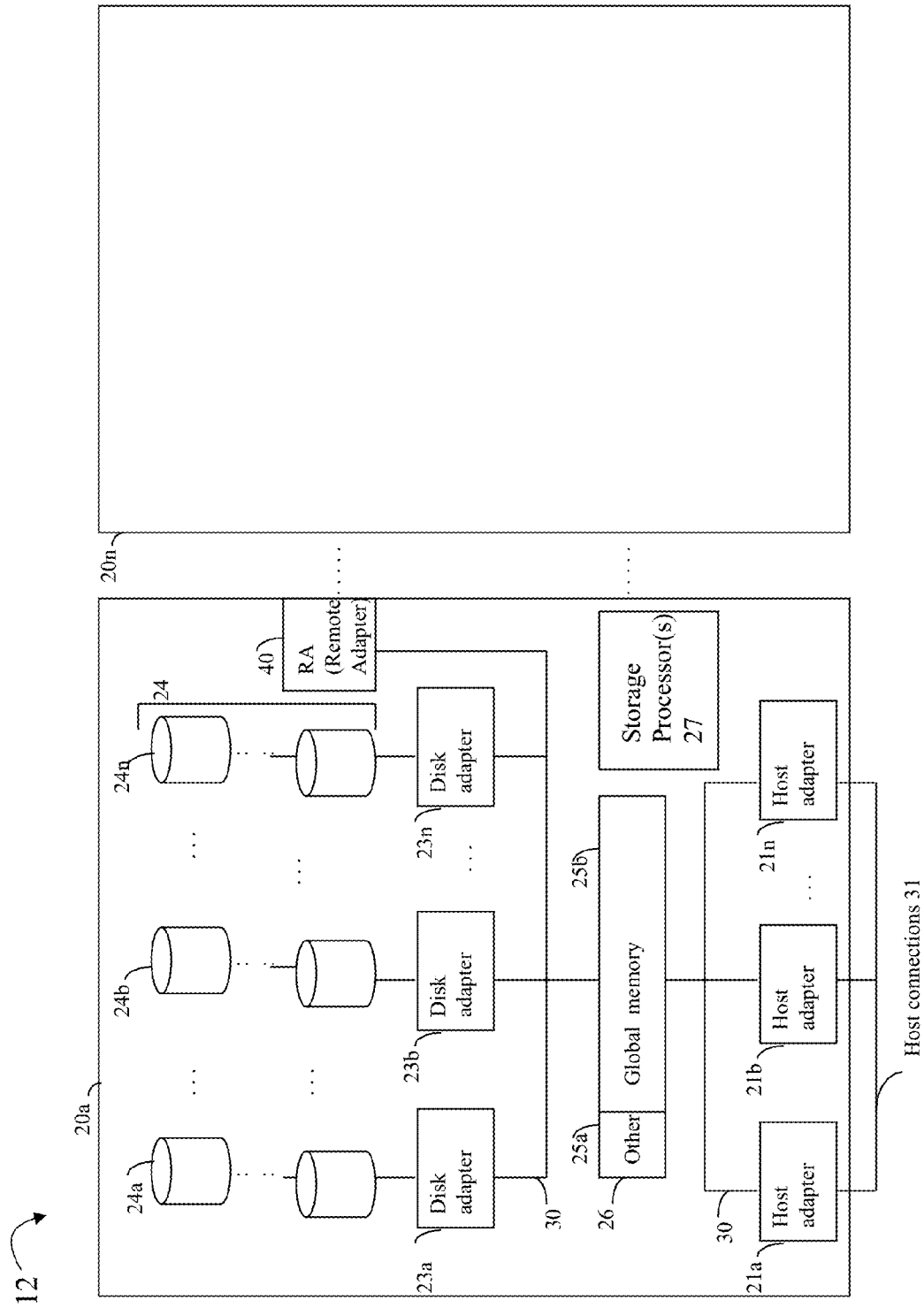

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, VNX™ data storage systems, such as the VNX8000™ data storage system, by EMC Corporation includes two storage processors (SPs). The system 20a may also include one or more host adapters ("HAs") or directors 21a-21n. Each of the HAs may be used to manage communications and data operations between one or more host systems and the global memory. In an embodiment, the HA may be a Fibre Channel Adapter or other front end adapter (FA) which facilitates host communication. The HA communicates with a component of the host such as a host bus adapter (HBA). Generally, directors may also be characterized as the different adapters, such as HAs (including FAs), DAs RAs, and the like, as described herein. RAs (remote adapters) are described in more detail below. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be noted that FIG. 2 generally illustrates components of the data storage system including multiple SPs 27, global memory such as 25b (also referred to herein as main memory accessible to the different adapters and other components of the data storage system), and the like. Described elsewhere herein are further details regarding how global or main memory and SPs may be configured in an embodiment in accordance with techniques herein. In an embodiment in accordance with techniques herein, the global or main memory 25b of FIG. 2 may be a logical representation of such memory having a physical implementation such as described elsewhere herein.

The particular data storage system as described in this embodiment, or a particular data storage device thereof, such as a mechanical rotating disk or SSD storage device, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

It should be noted that the data storage system may include multiple SPs in order to provide for redundancy whereby one of the SPs may be active or primary. In the event the active or primary SP fails or otherwise experiences a degradation thereby entering an unhealthy functional state, the other remaining SP may take over and function as the primary SP. In such a system, various suitable processing may be performed to ensure that each of the SPs has sufficient data and state information to assume the role of active or primary SP.

A data storage system, or more generally any suitable system, may include multiple computer processing units (CPUs) also referred to generally as processors. Such systems may utilize a NUMA (Non-Uniform Memory Access) architecture. Generally, NUMA may be characterized as a shared memory architecture that describes the placement of main memory modules with respect to processors in a multiprocessor system. NUMA architecture may be contrasted or compared to a UMA (Uniform Memory Access) architecture in which each processor uses the same shared bus to access memory whereby memory access time is uniform across all processors and memory access time is uniform no matter which memory module contains your data. Thus, in NUMA architectures, the memory access time varies with the location of the data to be accessed by a particular processor. For example, if the data of a processor needs to access is stored in its own local memory module, the data access time is faster than if the data to be accessed is located in a remote memory module (e.g., local to another processor). Therefore, memory access time in the NUMA architecture may be further characterized as non-uniform. In contrast to UMA architecture, in NUMA architectures, each processor may have its own local memory module (e.g., portion of shared memory that is local with respect to that processor) that it can access directly. Additionally, each processor can also access any memory module (e.g., other portions of shared memory) which are characterized as local with respect to other processors.

In some existing systems and architectures, such as in Intel-based processor architectures and systems based on the Intel Core i7 processors, multiple processors or "cores" may be grouped together on the same processor package or CPU socket. Multiple processors within the same CPU socket share access to memory modules using the UMA shared memory architecture. At the same time, such processors in the same CPU socket can also access memory modules from other nodes or CPU sockets such as using a fast interconnect technology called QuickPath Interconnect (QPI) in Intel-based architectures. More generally, QPI is one example of an inter-CPU socket connection that may be used for communications between CPU sockets. Thus, within a single CPU socket, the model may be characterized as UMA. However, in the multi-CPU socket context as a whole, the model may be characterized as NUMA. This is described in more detail below.

Main memory (e.g., comprised of the memory modules as noted above and elsewhere herein which may also be referred to as global memory) of a system (where such main memory is accessible to all processors or CPU sockets in the system), may be used, in whole or in part, as a data cache. For example, the memory modules may be used as a data cache in connection with storing data of read and write operations. It should be generally noted that reference may be made herein to a cache, cache hit, cache miss, and the like. In such instances in following paragraphs describing techniques herein, reference to cache generally means data cache of the main memory comprised of such memory modules as also described herein. For a read operation, a read request may result in either a cache hit (e.g., read hit) or a cache miss (read miss). With a cache hit, the requested read data is already located in cache and is simply retrieved from the cache and returned to the requesting client. With a cache miss, the requested read data is not found in cache. In order to service the read request when the data is not currently in cache, the requested read data is retrieved from the physical storage device, stored in cache, and then provided to the requesting client, such as a host. In connection with write requests, a data storage system in an embodiment in accordance with techniques herein may implement write-back caching. When a write request is received, the data to be written may be stored in cache and marked as write pending. At a later point in time, the write pending data may be destaged whereby such data is written out from the cache to the physical storage device. An acknowledgement may be sent to the requesting client, such as a host, once the write pending data is written to cache. It should be noted that the cache may already contain an entry corresponding to the write operation location. For example, the write operation may indicate to write data to a particular LUN and LBA (logical block address) on that LUN, such as LUN X, LBA Y. At the time the write operation is received, there may already be an existing write pending entry in the cache for LUN X, LBA Y. In this case, the received write operation data may be stored in the existing cache entry with the new write data. Alternatively, if there is no existing write pending entry in the cache for LUN A, LBA Y, a cache entry may be allocated for storing the write operation data.

Figure 3:
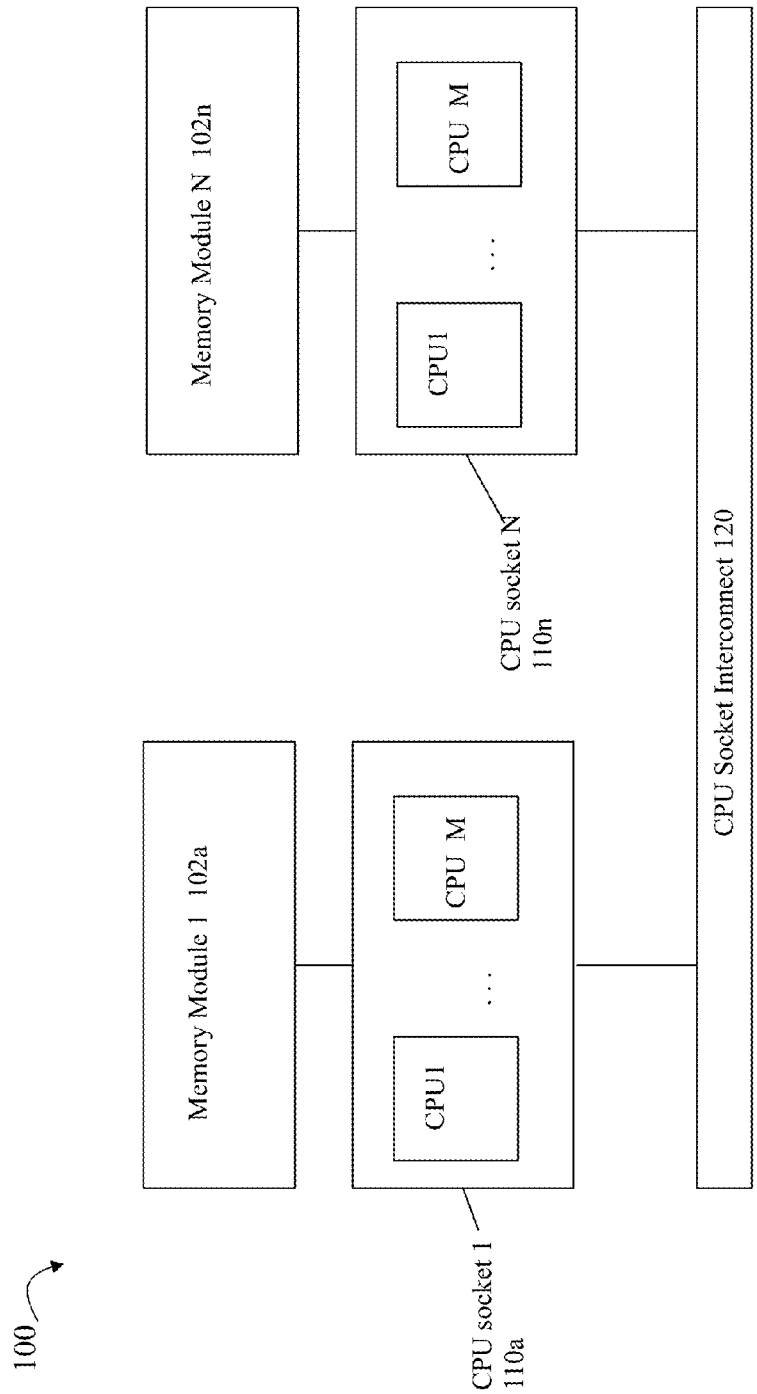
FIGS. 3, 3A, 3B, and 3C are examples of components that may be included in a storage processor (SP) of a data storage system in an embodiment in accordance with techniques herein.

Referring to FIG. 3, shown is one example illustrating processors and memory in an architecture that may be used in an embodiment in accordance with techniques herein. The example 100 includes memory modules 102a-n, CPU sockets 110a-n, and CPU socket interconnection 120 (also referred to as the intersocket communication connection 120). The number of CPU sockets and memory modules may be any suitable number such as, for example, more than 1. Each CPU socket, such as 110a, may include one or more processors or CPUs (e.g., M≥1). In the example 100, each CPU socket may include the same number of CPUs and each such CPU socket may access a local memory module. For example, CPU socket 110a has memory module 102a as its local memory module and CPU socket 110n has memory module 120n as its local memory module. In this example, each of the memory modules 102a-n may be of the same size and may be formed from any suitable form of memory known in the art. For example, the memory modules 120a-n may be DRAM modules. Memory modules 120a-n may comprise collectively or in the aggregate shared main memory that is shared among all CPUs of all CPU sockets 110a-n. A CPU on a particular CPU socket may access its local memory module directly (e.g., without having to use the interconnect 120) and may also access any of the other N memory modules over the interconnect 120. For example, CPU socket 110a may access data in module 102a directly and may also access data of module 102n indirectly through communications over the interconnect 120 and through CPU socket 110n. It should be noted that an embodiment may include other components, such as CPU-local cache, not illustrated for simplicity.

In connection with an Intel-based architecture as may be included in an embodiment, the interconnect 120 used for inter-CPU socket communication may be a QPI connection providing for communication between the CPU sockets 110a-n. More generally, element 120 may represent any suitable intersocket communication connection such as, for example, a bus.

As will be described in more detail below, some or all of the storage of the memory modules 102a-n may be used as a cache such as described elsewhere herein. For example, such memory may be used in connection with a data cache for read and write operation data as also described herein. Additionally, as described in following paragraphs and example, each of the CPU sockets may be associated with one or more DAs and also one or more FAs which may be characterized as local to a CPU socket and its associated local memory module.

Figure 3A:
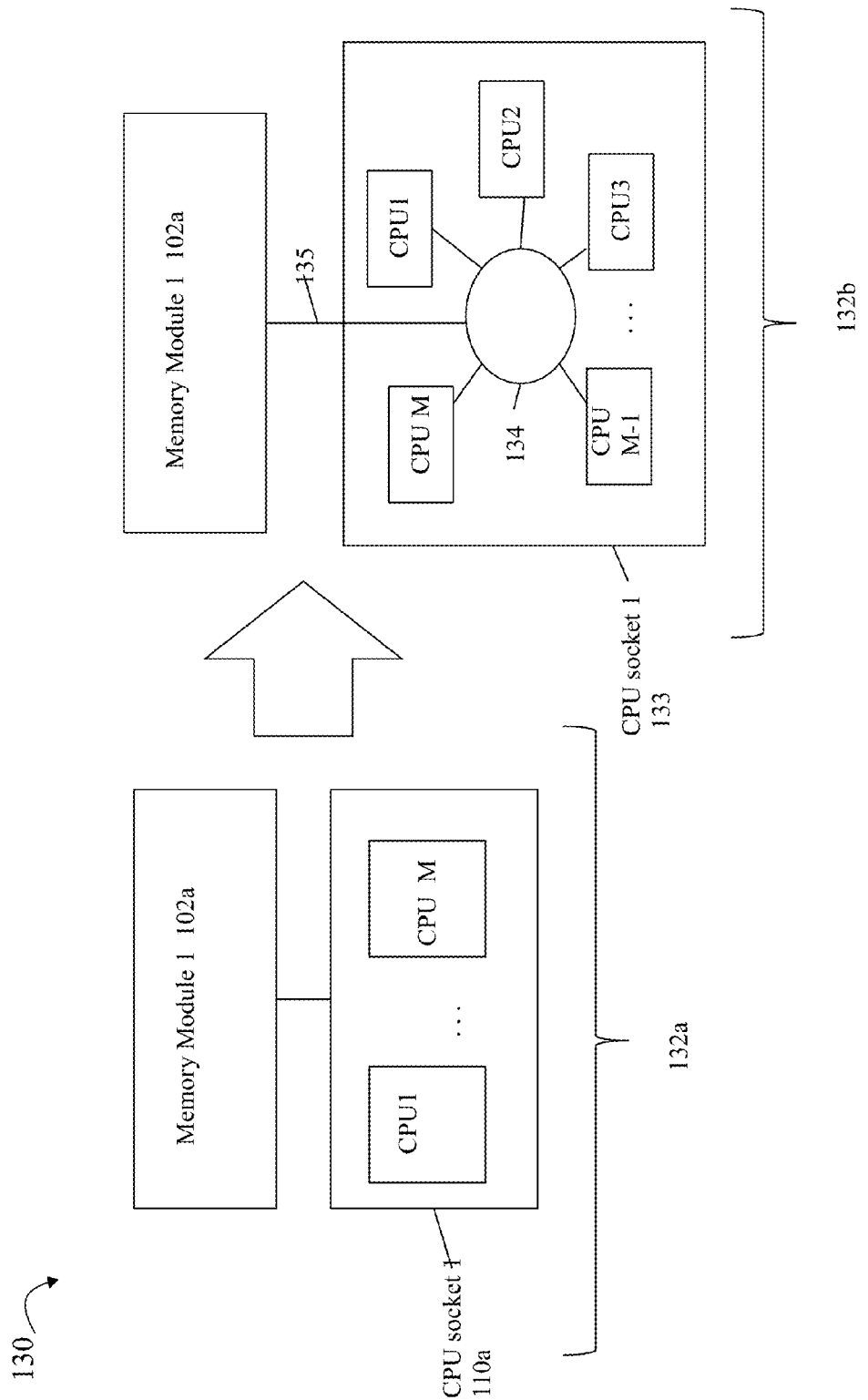

Referring to FIG. 3A, shown is an example illustrating in more detail the CPU configuration in a single CPU socket that may be used in an embodiment in accordance with techniques herein. Element 132a illustrates memory module 102a and CPU socket 110a as described in the example 100. Element 132b illustrates in more detail the CPU configuration of the CPU socket 1 which, in 132a and in FIG. 3 is noted as element 110a and which, in the representation 132b is noted as element 133. In element 133, a ring 134 connects the M CPUs of the socket to one another. Additionally, the ring 134 is also connected via 135 to memory module 102a. The ring 134 and connection 135 may be, for example, an I/O bus, I/O hub, or other suitable connection over which the M CPUs of 133 may access data in module 102a and also communicate with one another.

Although the example 130 illustrates a ring-like configuration 134, any suitable arrangement and configuration such as included in any suitable architecture may be used in an embodiment with techniques herein.

For NUMA systems, resources may be partitioned into NUMA memory domains (also referred to as NUMA domains). Each NUMA domain is defined based on CPUs able to directly access a particular memory module and relates to the access time for any CPU in the domain to access memory of the NUMA domain. A NUMA domain as illustrated herein may include memory (e.g., one or more bytes of memory such as DRAM), CPUs (e.g., one or more CPUs) and an I/O bus or I/O hub providing for communication between the CPUs and memory within the NUMA domain (e.g., intra-domain communication connection). Alternatively, a NUMA domain may include memory without any CPUs, or only CPUs without any memory. Additionally, a single NUMA domain may include none or more I/O hubs for intra-domain communications (e.g. such as represented by 134, 135). All CPUs included in the same NUMA domain have a similar access time for accessing data in memory also included in the same NUMA domain. Generally, one or more NUMA domains may be included in the same CPU socket although examples herein may illustrate a single NUMA domain per CPU socket where each single NUMA domain includes memory, a group of one or more CPUs, and one or more intra-domain communication connections (e.g., such as represented by 134, 135). In connection with the concept of a NUMA domain and with reference to FIG. 3, the socket interconnect 120 may also be characterized and referred to as an interdomain communication connection between NUMA domains.

Memory module 102a may be characterized as local with respect to CPU socket 1 110a and its CPUs. Memory module 102a may also be characterized as local with respect to the NUMA domain that includes 110a and 102a. Similarly, remaining ones of the N memory modules may be characterized as local with respect to CPU sockets directly accessing such memory modules (whereby the memory module and CPU socket are in the same NUM domain). Memory modules 2-N are non-local or foreign with respect to CPU socket 110a (included in a NUMA domain different from the modules 2-N). Generally, with respect to a first component (e.g., CPU socket, first memory module, etc.) included a first NUMA domain, all other components (e.g., CPU sockets, memory, etc.) in other NUM domains may be characterized as non-local or foreign.

To further illustrate, FIG. 3A includes a single NUMA domain including CPU socket 1 110a (or 133) and memory module 102a. Referring back to FIG. 3, illustrated are N NUMA domains each including a CPU socket of M CPUs or cores and one of the N memory modules directly connected to each particular CPU socket (e.g., NUMA domain 1 includes memory module 102a and M CPUs of 110a, . . . NUMA domain N includes memory module 102n and M CPUs of CPU socket 110n). For example, with reference to FIG. 3, for a first CPU of the first NUMA domain 1 to access memory module N 102n that is not directly connected to it (e.g. within another NUMA domain N), the first CPU may request the NUMA domain N (e.g. such as through a CPU of NUMA domain N) to access the memory module 102n on its behalf, thereby causing extra latency to access data in another NUM domain. Thus, the access time is not uniform for accessing all memory locations in the memory modules each located in a different NUMA domain (e.g., access time varies with the first NUMA domain of the particular CPU requesting the data and the second NUMA domain including the particular memory module that contains the requested data).

Figure 3B:
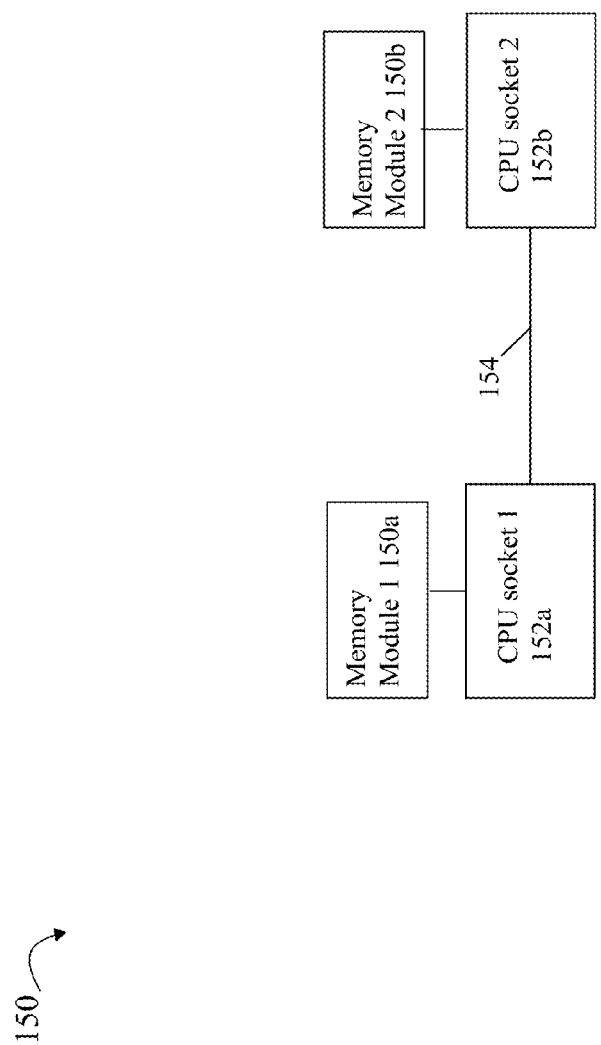

Referring to FIG. 3B, shown is an example illustrating two CPU sockets and associated memory modules as may be used in an embodiment in accordance with techniques herein. The example 150 illustrates a particular arrangement with two CPU sockets 152a,b and two memory modules 150a, b. Element 154 may represent the QPI connection between 152a-152b.

Figure 3C:
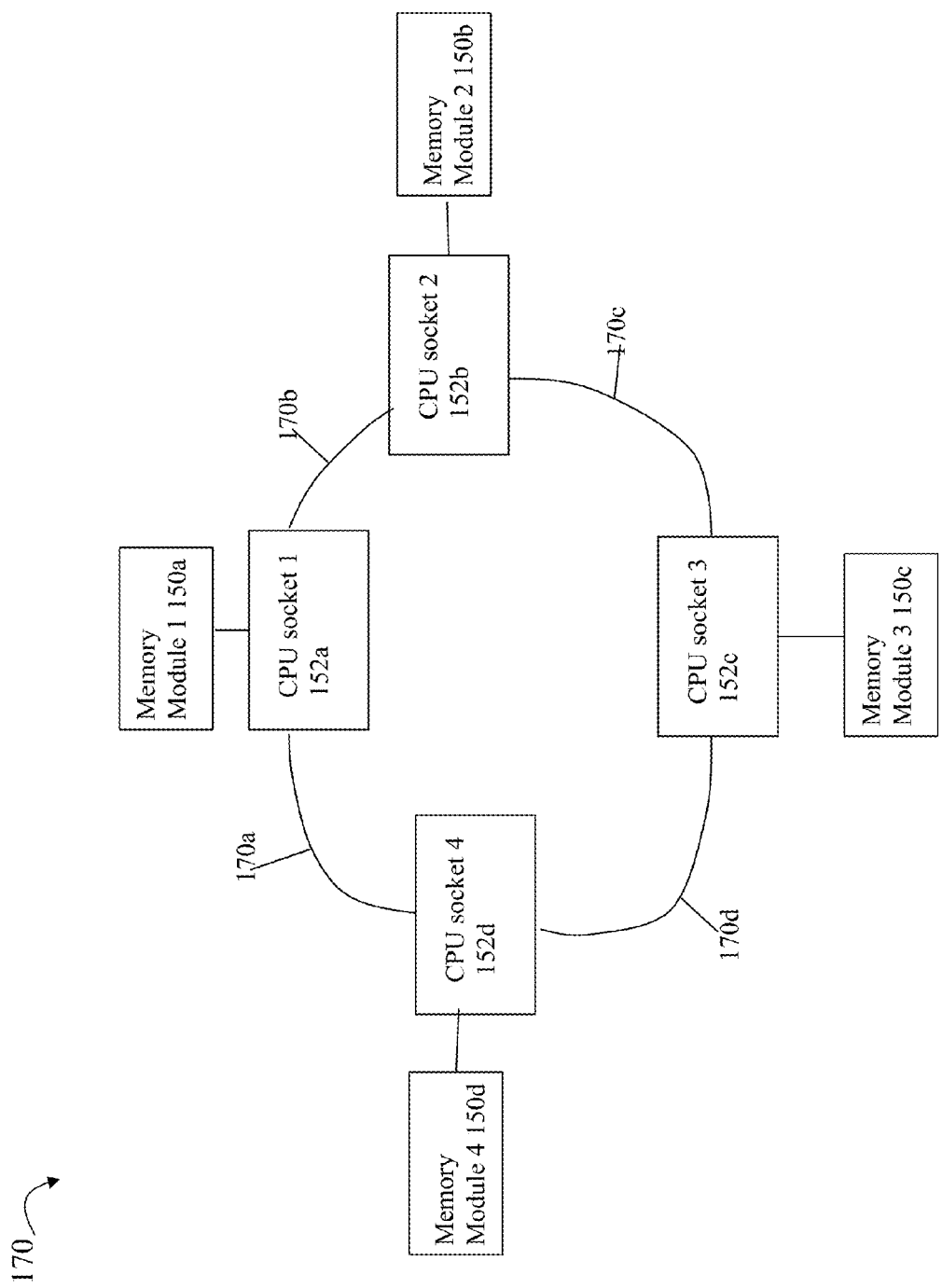

Referring to FIG. 3C, shown is another example illustrating four CPU sockets and associated memory modules as may be used in an embodiment in accordance with techniques herein. The example 170 illustrates a particular arrangement with four CPU sockets 152a-d and four memory modules 150a-d. Elements 170a-d may represent the QPI connections between 152a-152d.

It should be noted that FIGS. 3B-3C are examples of a particular number of CPU sockets and memory modules more generally represented in FIG. 3. In following examples and figures, reference may be made for simplicity to an embodiment in which each of the two (s) SPs of the data storage system may include two CPU sockets as in FIG. 3B, where each CPU socket includes a single NUMA domain of both memory and CPUs. However, other arrangements and embodiments are possible such as where a single socket includes multiple NUMA domains. Additionally, to further illustrate, following paragraphs also refer to examples of embodiments in which each SP of the data storage system may include more than two CPU sockets such as, for example, embodiments including four CPU sockets as in FIG. 3C.

When there are multiple NUMA domains, the memory may be configured as interleaved with respect to logically contiguous data portions or chunks. A system may be configured such that the main memory (as described herein which includes multiple memory modules) is interleaved whereby a data portion stored in the memory is stored in logically contiguous chunks in a round-robin fashion among the different memory modules forming the collective cache memory. For example, assume for simplicity a chunk or interleave data portion size of 2K bytes. With reference to FIG. 3B in an exemplary embodiment with two memory modules 150a-150b used for the cache, when caching a data portion, a first 2K chunk of the data portion (such as bytes 1 through 2K) is stored in module 1 150a, a second 2K chunk of the data portion (such as bytes 2K+1 through 4K) is stored in module 2 150b, a third 2K chunk of the data portion (such as bytes 4K+1 through 6K) is stored in module 1 150a, a fourth 2K chunk of the data portion (such as bytes 6K+1 through 8K) is stored in module 2 150b, and so on, with alternating chunks of logically contiguous data between the two memory modules. In such a case, assume a read request is received to read 4K of data not yet in cache. The 4K of data is retrieved and the first 2K portion may be stored in cache in memory module 150a and the second remaining 2K portion may be stored in cache in memory module 150b. In a similar manner, a write request may be to write 4K of data and the first 2K portion of write data may be stored in 150a and the second remaining 2K portion of write data may be stored in 150b whereby both data portions may be later destaged to the physical storage device as described elsewhere herein.

The size of the alternating chunks may vary thereby providing varying granularities of interleaving used in an embodiment. For example, a system may provide fine granularity interleaving whereby the size of the alternating chunks may small, for example 64 bytes. Alternatively, a system may provide for coarser granularity interleaving whereby the size of the alternating chunks is generally larger than one data cache line or entry. For example, the size of each alternating chunk may be a multiple of the data cache line size represented as "N" times the size of a single cache line or entry in the cache, whereby N is an integer that is greater than 1. In the latter case, the size of the alternating chunks may be N cache lines or N cache entries. In some embodiments, the size of the alternating chunks may equal the size of a memory module (e.g., the size of memory module 1 150a). This is sometimes referred to as non-interleaved.

In following paragraphs, an embodiment in accordance with techniques herein may utilize a coarse granularity size for the alternating chunks whereby each chunk has a size that is larger than a single data cache line or entry, or more generally, the size of N data cache lines or entries, N>1.

In following paragraphs, an embodiment in accordance with techniques herein may utilize a coarse granularity size for the alternating chunks whereby each chunk has a size that is larger than a single cache line or entry, or more generally, the size of N cache lines or entries, N>1.

Figure 4:
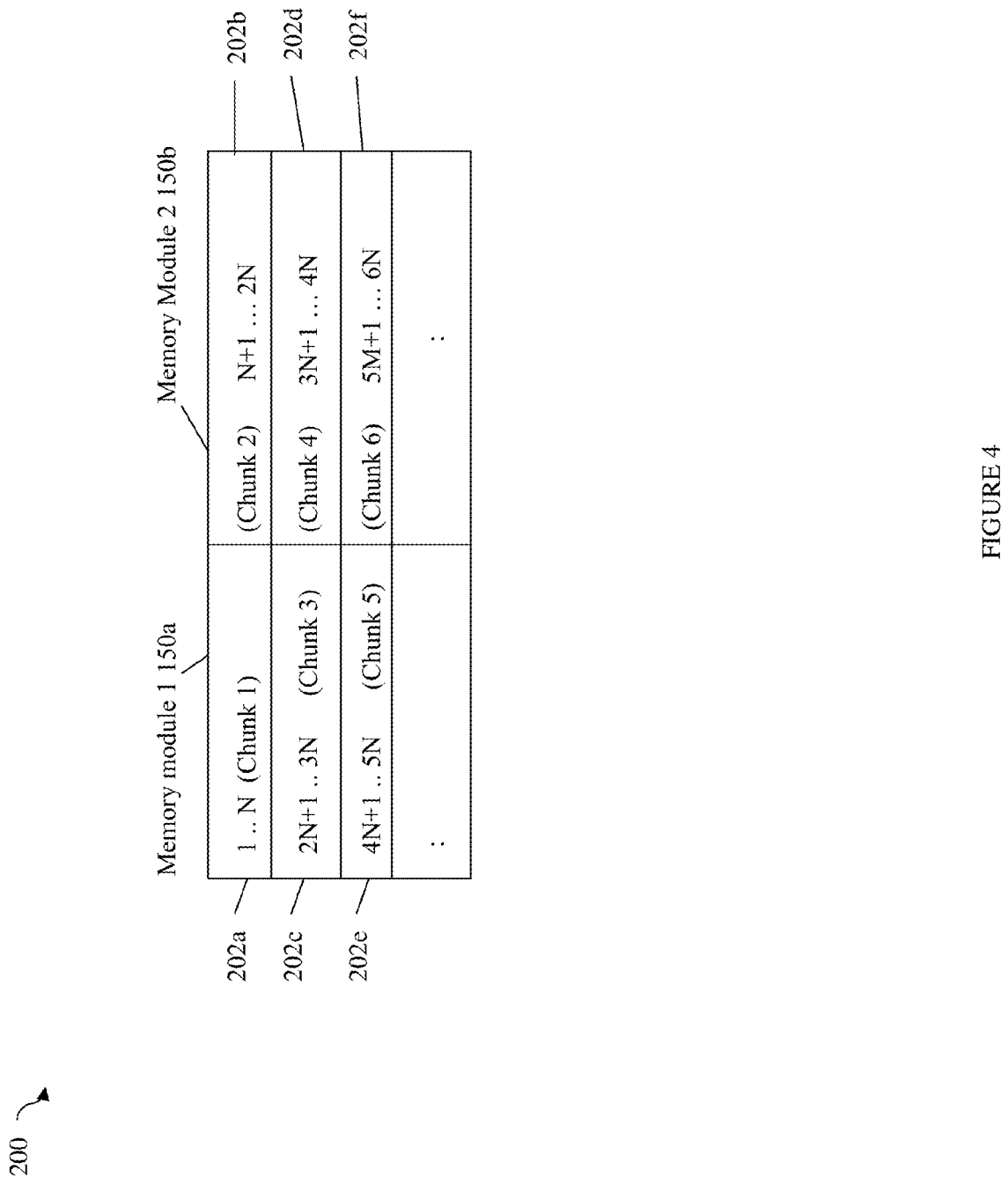
FIG. 4 is an example illustrating mapping of contiguous portions of data chunks to memory modules comprising the cache in an embodiment in accordance with techniques herein.

Referring to FIG. 4, shown is an example illustrating interleaving of data chunks in an embodiment in accordance with techniques herein. The example 200 illustrates how data may be stored in terms of alternating chunks in a data cache including two memory modules 150a, 150b as described in FIG. 3B. In this example, each alternating chunk is expressed as a size N whereby N may represent the size of N cache lines or entries as described above, N>1. In this manner, each alternating contiguous chunk corresponds to multiple cache lines or cache entries of data. In one example, a data portion stored in the cache may have a size equal to 6 chunks whereby elements 202a-f represent, respectively, the 6 contiguous chunks of data as noted stored in an alternating manner in each of the 2 memory modules 150a-150b. Chunks 1, 3 and 5 denoted, respectively, 202a, 202c and 202e are stored in memory module 150a. Chunks 2, 4 and 6 denoted, respectively, 202b, 202d and 202f are stored in memory module 150a. Continuing in such a manner and more generally, data portions (stored in the cache comprising such memory modules) may be of any size partitioned into any number of chunks stored in the cache in a similar manner.

In an embodiment in accordance with techniques herein, such interleaving may be implemented at the hardware level when data is stored to the cache comprising such interleaved memory modules. Techniques described in following paragraphs may be characterized as hardware dependent on such interleaving and are therefore aware of such interleaving, the interleaving granularity, and the like, in order to know where and how such data is stored in the cache.

Figure 5:
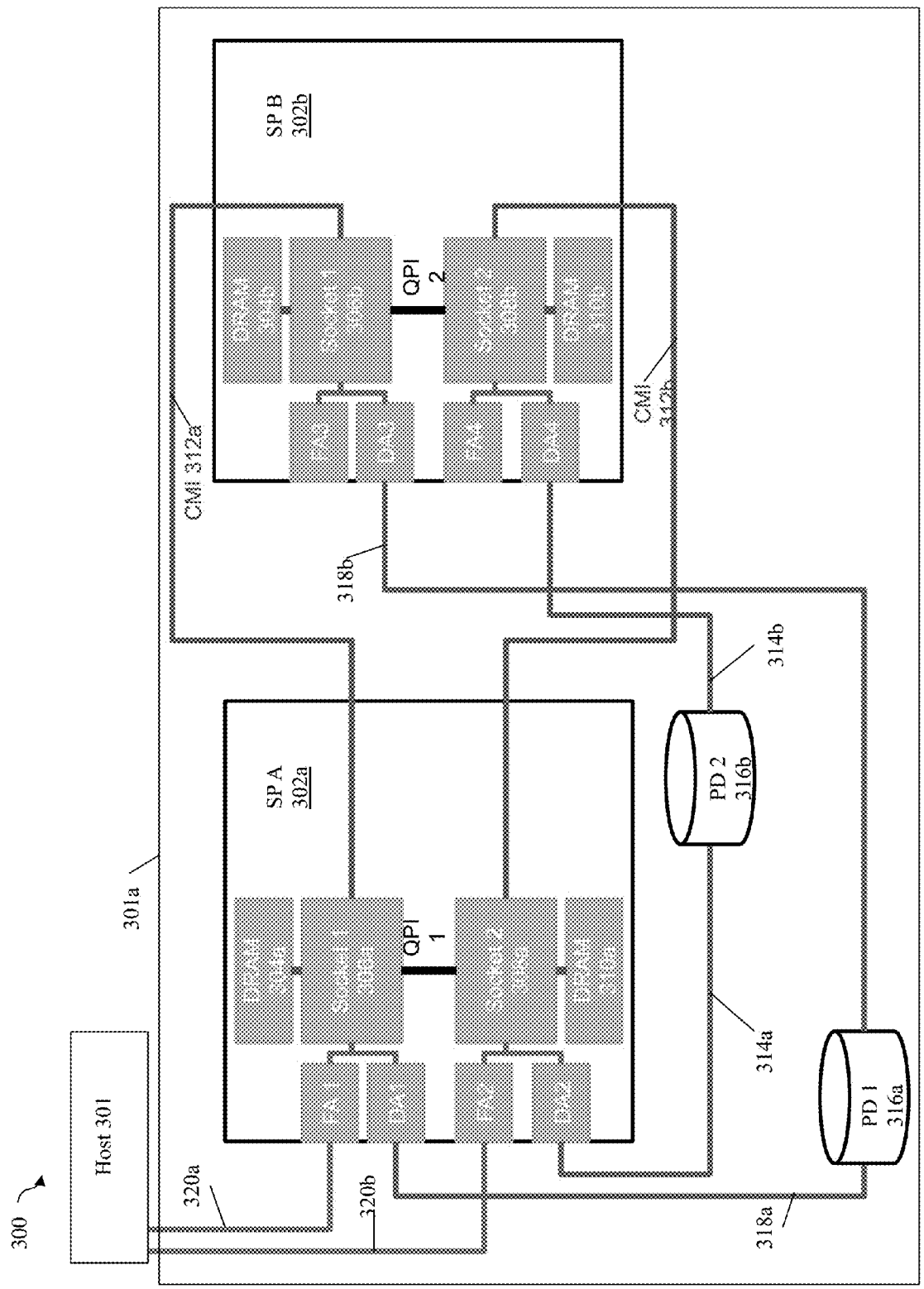
FIGS. 5 and 5A are examples of components that may be included in a data storage system.

Referring to FIG. 5, shown is an example 300 of a data storage system 301a and host 301. The data storage system 301a includes two SPs 302a-b, physical storage devices (PDs) 316a-b and main memory shared within each SP. For example, DRAM 304a and 310a comprise the main memory shared between CPUs or processors in SP A 302a and DRAM 304b and 310b comprise the main memory shared between CPUs or processors in SP B 302b. It should be noted that a data storage system may include any number of one or more SPs although two are illustrated here in this example. In following description, the DRAM components such as 304a, 304b, 310a and 310b may also be referred to more generally as memory. SP A 302a includes CPU sockets 306a, 308a, each of which can include one or more processors or cores as described elsewhere herein. SP A 302a and SP B 302b may have a NUMA configuration as described herein with NUMA domains where CPU socket(s) in a domain are associated with local memory in the same domain. A NUMA domain may also include different adapters, such as one or more DAs and one or more FAs (e.g., front end adapters such as fibre channel adapters or host adapters mentioned elsewhere herein) which are local to the NUMA domain. Such adapters which are local to the NUMA domain are associated with memory and CPU sockets local to that domain. SP A 302a may include two NUMA domains. SP A 302a may include a first NUMA domain including CPU socket 306a associated with DRAM 304a where memory 304a is local to CPU socket 306a. CPU socket 306a may be associated with FA1 and DA1 (e.g., FA1 and DA1 are local to the first NUMA domain and local to CPU socket 306a). SP A 302a may include a second NUMA domain including CPU socket 308a associated with DRAM 310a where memory 310a is local to CPU socket 308a. CPU socket 308a may be associated with FA2 and DA2 (e.g., FA2 and DA2 are local to the second NUMA domain and local to CPU socket 308a).

SP B 302b may include two NUMA domains. SP B 302b may include a first NUMA domain including CPU socket 306b associated with DRAM 304b where memory 304b is local to CPU socket 306b. CPU socket 306b may be associated with FA3 and DA3 (e.g., FA3 and DA1 are local to the first NUMA domain of SP B and local to CPU socket 306b). SP B 302b may include a second NUMA domain including CPU socket 308b associated with DRAM 310b where memory 310b is local to CPU socket 308b. CPU socket 308b may be associated with FA4 and DA4 (e.g., FA4 and DA4 are local to the second NUMA domain of SP B and local to CPU socket 308b).

SP A and SP B may be two SPs. In one embodiment of a data storage system such as a VNX™ data storage system by EMC Corporation, two such SPs may be included to provide high availability. Resources (e.g., files, LUNs, physical storage devices, etc.) of the system may be distributed between the two SPs whereby each resource may be assigned to only one of the two SPs at a time for servicing. Alternatively, a resource may be shared between the two SPs using any suitable locking protocol (or other technique to synchronize use of the resource between SPs). An SP failover from a first SP may occur if the first SP fails or otherwise enters an unhealthy state. Such failover may occur for any reason such as due to SP reboot, SP hardware failure, etc. Upon the first SP failing over to the second peer SP, the second peer SP may take over and resume processing of the failed first SP's resources. SP A and SP B as illustrated in the example 300 may each include a same set of duplicate hardware components. Additionally, as noted elsewhere herein, processing may be performed in an ongoing manner to ensure that each of the SPs has sufficient state and other information to assume servicing the resources of the peer SP in the case of a failover.

As illustrated, DA2 and DA4 are backend adapters that access PD 2 316b such as to read data from, and write data to, PD 2 316b, and DA1 and DA3 are backend adapters that access PD 1 316a such as to read data from, and write data to, PD 1 316a.

CMI 312a and 312b generally represent inter-SP communication connections. In one embodiment, there may be a single CMI connection between each pair of corresponding CPU sockets where a first CPU socket of the corresponding pair is included in SP A and a second CPU socket of the pair is included in SP B. A pair of corresponding sockets as described herein may be denoted by each socket of the pair having a same integer reference number N, such as socket 1, socket 2, etc. A pair of corresponding sockets (e.g., socket is 306a, 306b) includes a first socket (e.g., 306a) in SP A and a second socket (e.g., 306b) in SP B with first memory (e.g., 304a) that is local to the first socket and second memory (e.g., 304b) that is local to the second socket. CMI 312a may be used for inter SP communications between corresponding socket 1*s* 306*a* and 306*b*, and CMI 312*b* may be used for inter SP communications between corresponding socket 2*s* 308*a* and 308*b*. For example, as described elsewhere herein, the CMI connection 312*a* may be used to copy or mirror data between 304*a* and 304*b*, and CMI connection 312*b* may be used to copy or mirror data between 310*a* and 310*b*, as well as other inter SP communications. It should be noted that following examples may make reference to the foregoing use of CMIs to transfer or mirror data between SPs. However, an embodiment may use other more indirect paths and connections to mirror data between SPs using a CMI. For example, data from 304*a* of SP A may be mirrored to 304*b* of SP B as follows: from 304*a* over QPI 1 to socket 2 308*a*, from 308*a* over CMI 312*b* to socket 2 308*b*, from 308*b* over QPI2 to socket 306*b* and stored in 304*b*.

Within SP A 302*a*, memory 310*a*, CPU socket 308*a* and adapters FA2, DA2 are non-local or foreign to CPU socket 306*a* (e.g., 308*a*, FA2, DA2, 310*a* are included in a different NUMA domain than 306*a* and 304*a*). In order to access memory 310*a*, FA1, DA1 and CPU socket 306*a* use QPI 1 (e.g., more generally referred to as intersocket or interdomain communication connection 1). Also within SP A 302*a*, memory 304*a*, CPU socket 306*a* and adapters FA1, DA1 are non-local or foreign to CPU socket 308*a* (e.g., 306*a*, FA1, DA1, 304*a* are included in a different NUMA domain than 308*a* and 310*a*). In order to access memory 304*a*, FA2, DA2 and CPU socket 308*a* use QPI 1.

Within SP B 302*b*, memory 310*b*, CPU socket 308*b* and adapters FA4, DA4 are non-local or foreign to CPU socket 306*b* (e.g., 308*b*, FA4, DA4, 310*b* are included in a different NUMA domain than 306*b* and 304*b*). In order to access memory 310*b*, FA3, DA3 and CPU socket 306*b* use QPI 2 (e.g., more generally referred to as intersocket or interdomain communication connection 2). Also within SP B 302*b*, memory 304*b*, CPU socket 306*b* and adapters FA3, DA3 are non-local or foreign to CPU socket 308*b* (e.g., 306*b*, FA3, DA3, 304*b* are included in a different NUMA domain than 308*b* and 310*b*). In order to access memory 304*b*, FA4, DA4 and CPU socket 308*b* use QPI 2.

As discussed elsewhere herein, accessing non-local memory using intersocket communication connections such as QPI1 and QPI2 may be slower than accessing local memory in the same NUM domain.

Data storage system 301*a* may receive I/O requests (e.g., read, write, etc.) from host 301 to operate on data stored in any of the PDs 316*a*, 316*b*. In the example 300, the host 301 may be connected to the data storage system 301*a* over connections 320*a* and 320*b* and may send I/O requests to the system 301*a* over either or both of connections 320*a*, 320*b*. For example, the host 301 may send a write request over connection 320*b* which is received at FA2. The write request may be to write data to PD 2 316*b*. FA2 writes the data (e.g., via DMA or direct memory access) to memory 310*a*. In this example, the write data may be marked as write pending that is later destaged to PD2 316*b*. As described herein, additional processing may be performed to provide SP B with sufficient state, data, and the like, should it need to take over the role of servicing SP A's resources on failover from SP A to SP B. Part of this processing may include copying the write data just received by SP A to SP B whereby SP B includes a mirrored copy of the write data in its memory 310*b*. Thus, processing is performed to copy or mirror the write data from 310*a* to 310*b* using CMI 312*b* (e.g., data of memory module 310*a* that is local to socket 2 308*a* of SP A may be mirrored to the corresponding socket 2 308*b* (located in SP B) of the "socket 2" pair). Additionally, at some time after the write data is placed in 310*a*, DA2 reads the write data from memory 310*a* (e.g., via DMA) and writes the data to the PD 2 316*b*.

Figure 5A:
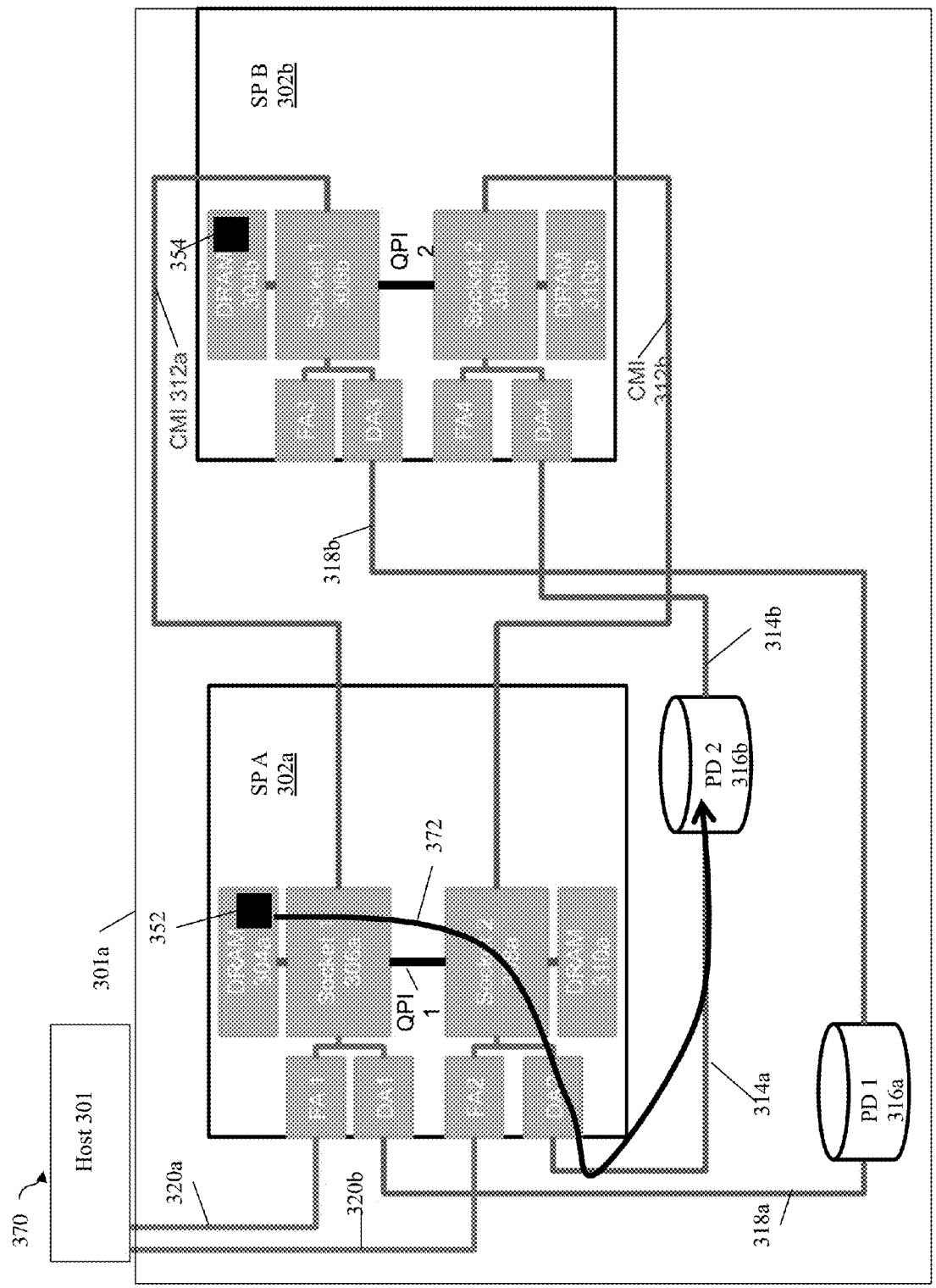

Alternatively, and with reference now to FIG. 5A, the write request to write data to PD 2 316*b* may be sent over connection 320*a* and received at FA1 (rather than FA2). FA1 writes the data 352 (e.g., via DMA or direct memory access) to memory 304*a*. In this example, the write data 352 may be marked as write pending that will later be destaged to PD2. The write data 352 may then be mirrored or copied from 304*a* to 304*b* over CM 312*a*. Element 354 represents the mirrored copy of the write data 352. At some time later, DA2 performs processing to destage the write data 352 currently stored in memory 304*a*. The DA2 obtains data 352 from memory 304*a* for destaging over QPI1 as illustrated by 372 and writes the data 352 to the PD 316*b*. As noted above, transferring such data over QPI 1 may result in decreased performance of SP A and the data storage system 301*a* overall. It should be noted that a read request may be similarly sent to FA1 or FA2 and serviced accordingly. For example, a read request may be received at FA2 to read data from PD 2 316*b*. To service this request, DA2 may retrieve the requested read data from PD 2 316*b* and store the data in memory 310*a* (e.g. via DMA). FA2 may then retrieve (e.g., via DMA) the data from 310*a* and provide the data to the host. Alternatively, the read request may be received at FA1 to read data from PD 2 316*b*. To service this request, DA2 may retrieve the requested read data from PD 2 316*b* and store the data in memory 310*a* (e.g. via DMA). FA1 may then retrieve, via QPI 1, the data from 310*a* and provide the data to the host.

Since use of the QPIs, or more generally, intersocket or interdomain communication connections, may adversely impact performance, steps may be taken to improve performance of an SP with a NUMA configuration by reducing usage of the intersocket or interdomain communication connections when reading from and/or writing to local memory. One such proposal may include increasing the storage paths or connections between CPU sockets and PDs whereby each CPU socket may be connected to each PD via one of the CPU socket's associated local DA. For example, with reference to FIG. 5A, only DA1 and DA3 are connected to PD1 316*a* and only DA2 and DA4 are connected to PD2 316*b*. The configuration of this proposal would require additional hardware and connections to also connect DA2 and DA4 to PD1 316*a* and also connect DA1 and DA3 to PD 2 316*b* (e.g. total of 4 DA ports and connections from all DAs 1-4 to PD1 316*a*, and total of 4 DA ports and connection from all DAs 1-4 to PD2 316*b*). In such a configuration, I/O operations may be serviced using local memory. Such a configuration is described, for example, in U.S. application Ser. No. 14/041,988, filed Sep. 30, 2013, SYSTEMS AND METHODS FOR STORAGE HAVING NUMA CONFIGURATION, O'Brien et al., which is incorporated by reference herein.

However, such a proposal has a disadvantage of added cost due to the additional required paths. Referring, for example, to the configuration of FIG. 5 and FIG. 5A, such a proposal requiring a path from each DA to each PD doubles the number of connections and paths between the DAs and the PDs. In the configuration of FIGS. 5 and 5A, each SP is connected, via one or more DAs local to that SP, to all PDs of the data storage system. However, each DA is not connected to each PD in the system as required by the foregoing proposal with the above-mentioned added cost disadvantage.

What will now be described are alternate proposals that may be used in an embodiment in accordance with techniques herein. An embodiment in accordance with techniques herein reduces the usage of the intersocket or interdomain communication connections without requiring the additional hardware and connections such as noted above.

Figure 6A:
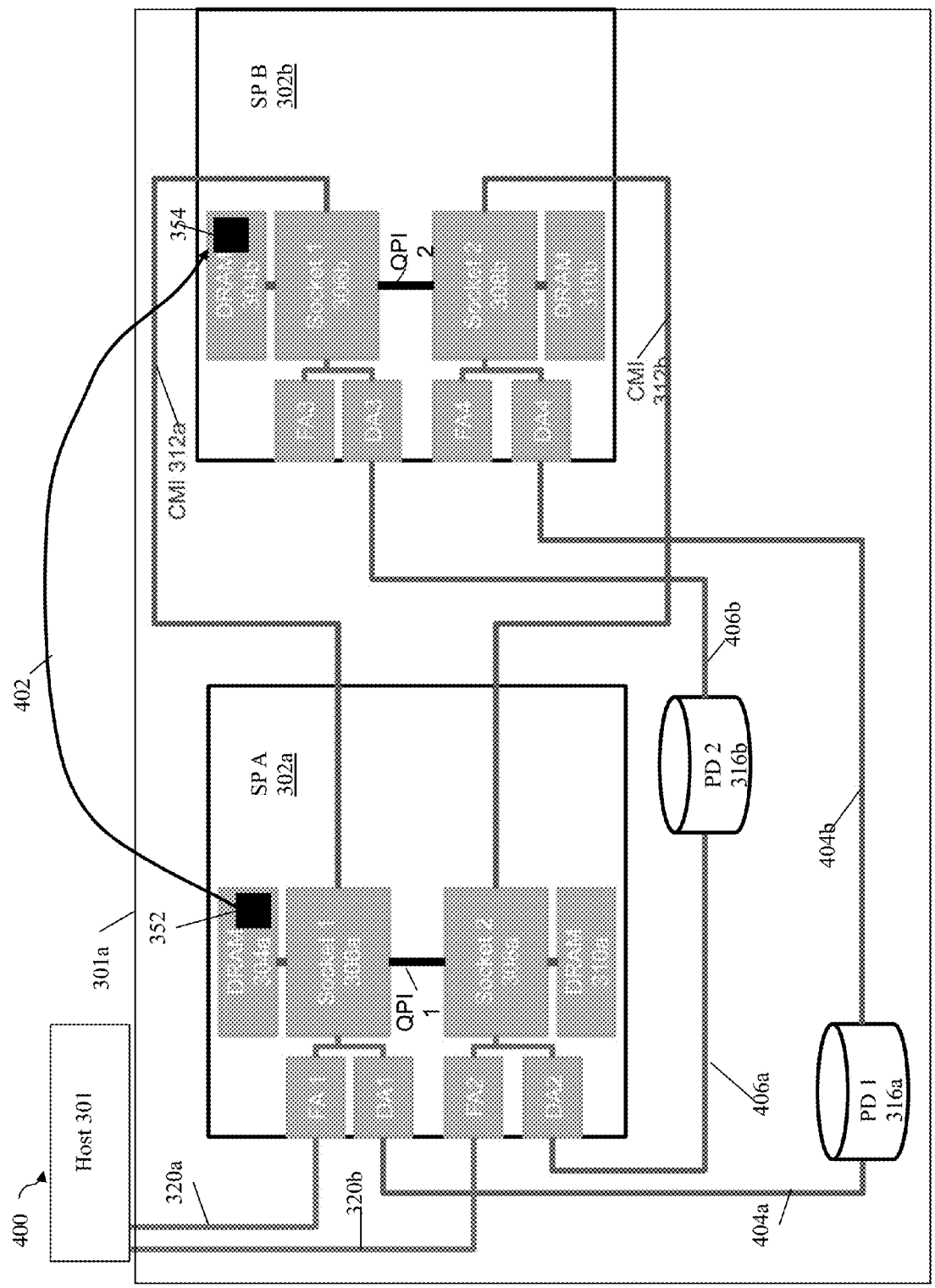
FIGS. 6A, 6B, 7A, 8, 8B, 8C, 9A and 9B are examples of components that may be included in a data storage system in an embodiment in accordance with techniques herein.

Referring to FIG. 6A, shown is an example of an embodiment of a system in accordance with techniques herein. The example 400 includes components as similarly numbered and described above in connection with other figures such as FIGS. 5 and 5A. In the example 400, however, the paths or connections between the DAs and PDs differ from that described above. There is a connection 406a between DA2 to PD2 316b, a connection 406b between DA3 and PD2 316b, a connection 404a between DA1 and PD1 316a, and a connection 404b between DA4 and PD1 316a.

As mentioned above, a pair of corresponding CPU sockets as described herein may be denoted by each socket of the pair having a same integer reference number N, such as socket 1, socket 2, etc. A pair of corresponding sockets (e.g., socket 1s 306a, 306b) includes a first socket (e.g., 306a) in SP A and a second socket (e.g., 306b) in SP B with first memory (e.g., 304a) that is local to the first socket and second memory (e.g., 304b) that is local to the second socket. For a corresponding pair of CPU sockets, write request data cached in the first memory module of SP A (whereby the first memory modules is local to the first socket) may be automatically mirrored or copied to the second memory module of SP B (whereby the second memory modules is local to the second socket) using the CMI connection therebetween (e.g., CMI 312a). By providing a connection from a first DA (e.g., DA1) that is local to (e.g., included in the same NUMA domain as) the first socket (e.g., 306a) of the corresponding socket pair, and a connection from a second DA (e.g., DA3) that is local to (e.g., included in the same NUMA domain as) the second socket (e.g., 306b) of the corresponding socket pair, each socket of the corresponding pair is able to write to a different one of the two PDs 316a, 316b using data stored in its local memory module thereby performing the write to each of the two PDs 316a, 316b and avoiding use of the QPI.

Each socket of a corresponding socket pair (e.g., each of sockets 306a, 306b in different SPs and included in the corresponding socket 1 pair) has a local DA (e.g., in the same NUMA domain as the socket) that is connected to a different one of the two PDs 316a, 316b. For example, in SP A 302a, socket 1 306a is connected to a local DA1 (whereby 306a and DA1 are in the same NUMA domain), and DA1 is connected 404a to PD1 316a. In SP B 302b, socket 1 306b is connected to a local DA3 (whereby 306b and DA3 are in the same NUMA domain), and DA3 is connected 406b to PD2 316b. In such an arrangement, each socket of the corresponding pair is able to write to a different one of the two PDs 316a, 316b using data stored in its local memory module thereby performing the write to each PD and avoiding use of the QPI. Put another way, each PD of the data storage system may be connected to two DAs where a first of the DAs is local to a socket 1 (of a first corresponding socket pair) in a first of two SPs and a second of the DAs is local to a socket 2 (of a second corresponding socket pair) in a second different one of the two SPs. Thus, each PD may also be characterized as connected to two non-corresponding sockets each of which is located in a different SP and each of which is non-corresponding with respect to the other socket. Two sockets may be characterized as non-corresponding if each of the two sockets is identified by a different socket reference number and each of the two sockets is located in a different SP (e.g., socket 1 306a located in SP A and socket 2 308b located in SP B).

In such a configuration as in FIG. 6A, consider an example where in a first step a write request is received at the data storage system 301a from host 301 at an FA, such as, FA1. In a second step, memory is allocated in cache to store the write request data whereby such cached write data may be marked as write pending as described elsewhere herein. In at least one embodiment, such memory from cache for storing the write request or write pending data may be allocated from the memory module closest to the FA that received the write request. For example, memory from cache may be allocated from the memory module that is local to, or in the same NUMA domain as, the FA1 that received the write request. In this example, memory 304a is local to and in the same NUMA domain as FA1 whereby element 352 may represent the portion of memory 304a of the cache allocated and used for storing the write request data. It should also be noted that the memory 304a is local to, and included in the same NUMA domain as, socket 1 306a. Socket 1 306a of SP A also has a corresponding socket 1 306b in SP B.

In a third step, processing is performed to mirror the write request data currently stored in the cache of SP A to cache of SP B. In the third step, processing may be performed to mirror the write request data 352 of memory module 304a that is local to socket 1 304a of SP A in the memory module 304b that is local to corresponding socket 1 304b of SP B. As described elsewhere herein and illustrated by 402, such mirroring may be accomplished by copying write request data 352 over CMI 312a and storing a copy of the write request data 354 in memory module 304b (e.g., copying may be performed by a processor in CPU socket 306a).

In a fourth step, processing may be performed to destage the write request data. In this example, there is a first copy of the write request data 352 in memory module 304a of SP A 302a, and a second copy of the write request data 354 in memory module 304b of SP B 302b. The fourth step may include determining which of the cached data copies 352 or 354 to use when writing to physical storage. In an embodiment in accordance with techniques herein, the cached copy (and associated SP) used as a source of the destaging to physical storage may be the cached copy whose access does not require using the QPI to complete the write to physical storage. In other words, a determination may be made as to which DA can write the necessary cached data to physical storage using a locally cached copy of the data whereby the DA may access the data to be written out to physical storage from a memory module that is local to, or in the same NUMA domain as, the DA. More generally, such a determination regarding which copy (e.g., 352 or 354) of the write request data to use may be made by determining which cached copy of the data is closest to the DA that would be performing the writing of the data to the physical storage device.

In this example, assume that the target location of the write request corresponds to a physical storage device location in PD 2 316b. DA2 of SP A and DA3 of SP B are each connected to PD 2 and either DA2 or DA3 may therefore be used to store the cached write request data to PD2.

Figure 6B:
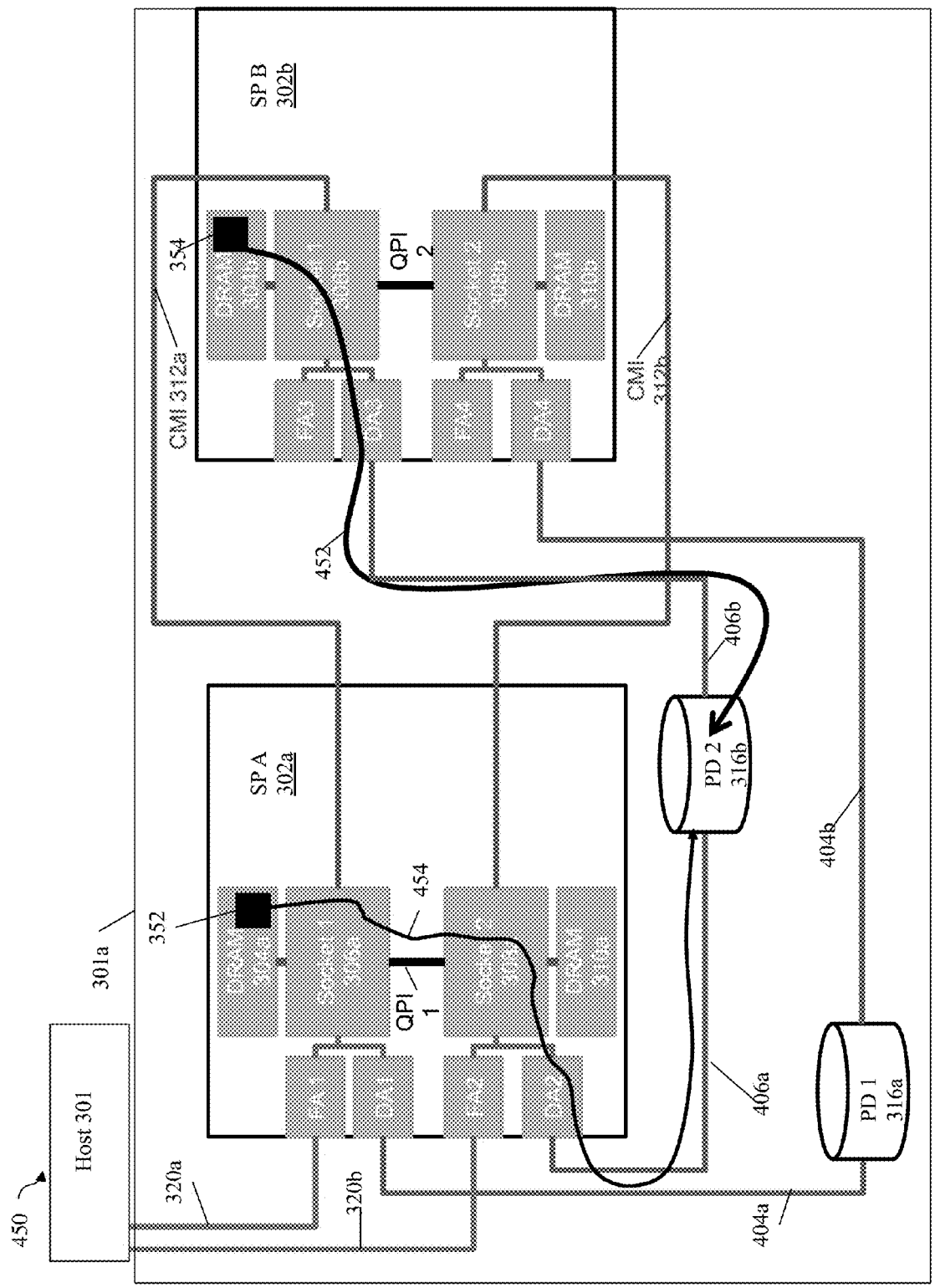

Based on the foregoing and with reference to FIG. 6B, DA3 may use the mirrored cache copy 354 of 304b of SP B to store the cached write request data to PD 2 without using the QPI (e.g., 354 stored in memory 304b is closer to DA3 (in the same NUMA domain) than 352 stored in memory 304a is with respect to DA2 (DA2 and 304a are in different NUM domains)). DA3, socket 1 306b and memory 304b (including the cached data 354) are included in the same NUMA domain. Thus, as illustrated by 452, DA 3 may access the cached data 354 of memory 304b (e.g., via DMA) and write the cached data 354 to PD2 316b. In contrast, use of DA2 to write out cached data 352 would require DA2 accessing data 352 over QPI 1 (e.g., 304a and DA2 are in different NUMA domains) as illustrated by 454.

As an alternative example, let the target location of the write request correspond to a physical storage device location in PD 1 316a. DA1 of SP A and DA4 of SP B are each connected to PD 1 and either DA1 or DA4 may therefore be used to store the cached write request data to PD1.

Based on the foregoing and with reference again to FIG. 6B, DA1 may use the cache copy 352 of 304a of SP A to store the cached write request data to PD 1 without using the QPI 1. DA1, socket 0 306a and memory 304a (including the cached data 352) are included in the same NUMA domain. Thus, DA 1 may access the cached data 352 of memory 304a (e.g., via DMA) and write the cached data 352 to PD1 316a. In contrast, use of DA4 to write out cached data 354 would require DA4 accessing data 354 over QPI 2 (e.g., 304b and DA4 are in different NUMA domains).

It should be noted that the foregoing illustrated in FIGS. 6A and 6B may be generalized to other embodiments and variations. For example, FIGS. 6A and 6B illustrate examples with only two PDs. In actual storage system configurations, more than two PDs may be utilized. In such systems, techniques herein may be generalized to partition the PDs of the system into two groups of PDs. Then, for each pair of corresponding CPU sockets, the system may be configured such that a first socket of the pair has a local DA (e.g., in the same NUMA domain as the first socket) that is connected to each PD in the first group of PDs and a second socket of the pair has a local DA (in the same NUMA domain as the second socket) that is connected to each PD in the second group of PDs. In this manner, the embodiment of FIGS. 6A and 6B may be generalized from two PDs (PD1 and PD2) to two PD groupings (each represented by PD1 and PD2). It should be noted that the foregoing is based on the assumption that I/O requests may arrive on any FA connected to at least one CPU socket of each corresponding CPU socket pair.

It should be noted that, more generally, the foregoing describes use of a heuristic and one or more criteria to make a determination regarding what DA, cached copy of the write pending data, and associated path to use when destaging the pending write data from cache to physical storage.

Examples in Figured 6A-6B and others herein may describe processing performed when data of an I/O operation, such write data of a write operation, is no larger than a single chunk (e.g., I/O operation data fits within one chunk denoting the interleaving size granularity). However, data for an I/O operation, such as write data of a write request received at an FA, such as FA1, may be larger than one chunk whereby such write pending data may stored in the interleaved memory modules 304a and 310a. In such a case where the pending write data is more than a single chunk, the pending write data may be stored in the memory modules 304a, 310a (and also memory modules 304b, 310b) in logically contiguous chunks as described elsewhere herein. In this manner, such techniques may be used to perform processing with respect to each chunk of the write pending data. In a similar manner, other I/O operations, such as read operations described in connection with other examples herein, may also be performed to store and access cached data (that is stored in an interleaved manner as described herein in the memory modules comprising the cache).

An embodiment in accordance with techniques herein may also retrieve data for read operations using an I/O path similar to that as described in connection with FIGS. 6A and 6B whereby such an I/O path selected may avoid use of any QPI.

Figure 7A:
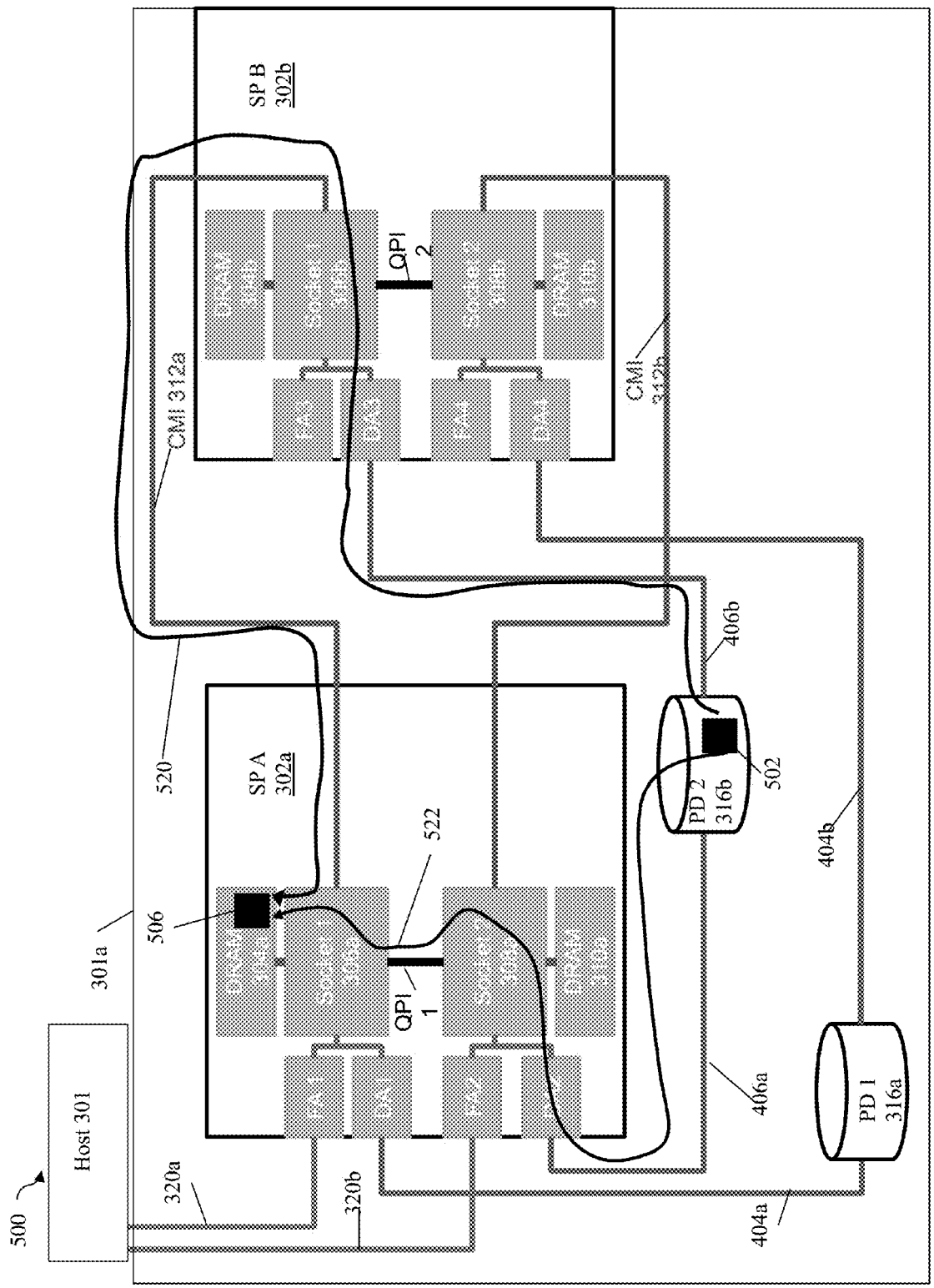

Referring to FIG. 7A, what will now be described is processing that may be performed in an embodiment in accordance with techniques herein to obtain data from physical storage for read operations. The example 500 includes components similarly numbered to those of previous figures which are as described above. The example 500 illustrates use of those components of the data storage system 301a in connection with performing a read operation in an embodiment in accordance with techniques herein.

As an example, consider a read operation request requested from host 301 at FA1 of SP A 302a. The read request may be to read data 502 stored on PD2 316b and such data may currently not be stored in cache memory 304a and must be retrieved from PD2 to service the read. As described above, the data 502 of PD2 may be read using either DA2 or DA3 since both such DAs are connected to PD2. Thus, an embodiment may perform processing to decide which of DA2 or DA3 to use when reading data 502 from PD2. In either case, the data 502 needs to be placed in cache 304a whereby FA1 may then read the data from 304a and return the requested read data to the host 301.

If DA2 is used to read the data 502, following is a first path 522 of components that may be traversed to store the data 502 in 304a: DA2 reads the data 502 from PD2 and the data 502 may be transferred from socket 2 308a across QPI 1 to socket 1 306a and stored in memory 304a. Element 506 may represent the cached copy of data 502. It should be noted that the data 502 may be also optionally stored in cache 310a prior to transferring across QPI 1 to socket 1 306a. If such optionally caching is not performed, the data 502 may be copied using the first path to memory 304a via DMA.

If DA3 is used to read the data 502, following is a second path 520 of components that may be traversed to store the data 502 in 304a: DA3 reads the data 502 from PD2 and the data 502 may be transferred from socket 1 306b across CMI 312a to socket 1 306a and stored in memory 304a. It should be noted that the data 502 may be also optionally stored in cache 304b prior to transferring across CM 312a to socket 1 306a. If such optionally caching is not performed, the data 502 may be copied using the second path 520 to memory 304a via DMA.

An embodiment in accordance with techniques herein may select a DA and associated path over which to read the data 502 based on whether a QPI would be used. In one embodiment, a decision may be made to use DA3 (and associated second path 520) rather than DA2 (and associated first path 522) since DA3 and the second path 520 does not use any QPI to read the data 502 from PD2 and store copy 506 of the data in memory 304a. Some embodiments may select to always use a particular DA and associated path (such as DA3 and second path 520) which does not use a QPI.

An embodiment in accordance with techniques herein may also utilize a heuristic and one or more criteria to more generally make a determination regarding what DA and associated path to use in connection with reading data from a physical device to service a read request. For example, an embodiment may use a heuristic and one or more criteria to determine whether to use DA3 and the second path 520, or use DA2 and the first path 522 to obtain the read request data for the read request received at FA1. Based on such a heuristic and associated criteria, an embodiment may make a decision whereby a first portion of read requests may be serviced using DA3 and the second path 520 and a second portion of read requests may be serviced using DA2 and the first path 522. Use of such a heuristic and associated criteria may be characterized as performing load balancing among the different possible paths. As will be appreciated by those skilled in the art, the use of the second path 520 avoids costs and possible performance bottlenecks by avoiding use of QPI 1. However, the second path 520 uses other resources such as CM 312a and incurs time and costs associated with use of such different data storage system resources which may also become overloaded or a bottleneck. Thus, an embodiment may use techniques to balance load among the different possible paths and associated resources of the data storage system.

For example, one embodiment may define a maximum number of outstanding read I/O requests (MAX READ). An outstanding read I/O request may be a read request received at the data storage system which requires reading data from physical storage to service the read request. The read request may be characterized as outstanding or pending once the request has been received at the data storage system and while waiting for read request data to be read from physical storage. The first path 522 (which uses the QPI 1) and DA2 may be used to service read requests unless and until the current number of outstanding read requests equals the threshold MAX READ. If a read request is received (which requires reading the requested data from physical storage) and the current number of outstanding read requests equals MAX READ, the second path 520 and DA3 may be used to service the read request. In this manner, the first path 522 and DA2 may be used to obtain read request data from PD2 until a particular threshold workload limit (as expressed using MAX READ) is reached. While at this particular threshold, the alternate second path 520 and DA3 may be used to service read requests requiring read data to be read from PD2. It should be noted that the threshold, or more generally criteria and associated heuristic, may be used in connection with all outstanding read requests for data to be retrieved from PD1 and PD2. Additionally, the criteria and heuristic used in an embodiment may also consider other types of workload or traffic on the QPI in connection with determining which DA and associated path to use for obtaining data from physical storage for servicing a read request.

It should be noted that an embodiment may generally use any suitable criteria and associated heuristic. For example, an embodiment may use a simple round robin technique and alternate between possible DAs and/or associated paths in a round robin fashion. For example, for two DAs and associated two paths 520, 522 as described above, each DA and associated path is used in an alternating pattern (e.g., each DA and path is used for every other read request requiring data to be read from physical storage). As another alternative, an embodiment may measure workload or traffic on a QPI based on data transfer or throughput such as based on the size of the I/O requests and amount of data transferred over the QPI. For example, a threshold may be used related to an amount of outstanding I/O in terms of bytes or I/O sizes of the outstanding read I/O requests. An embodiment may use any one or more of the above-mentioned criteria alone, or in combination with, other suitable criteria.

One embodiment in accordance with techniques herein may perform write operations as described herein in connection with FIGS. 6A and 6B and may also obtain requested read data from physical storage for servicing read operations in accordance with that as described in connection with FIG. 7A whereby a heuristic and associated criteria which assess QPI workload may be used to select a DA and associated path from possibly multiple candidate DAs and associated paths.

In connection with discussion of FIG. 7A above, it is mentioned that retrieved read data may be optionally cached in 304b or 310a. In one embodiment, data prefetching may be implemented when reading data from physical storage. As known in the art, data prefetching may be performed in response to detection of sequential read patterns. A sequential read pattern may be detected, for example, when multiple consecutive read operations result in sequentially reading a set of logically contiguous data. For example a first read operation may read data from LUN X, LBA 1-3 and a second read operation may read data from LUN A, LBA 4-6. Upon receiving the second read operation, a sequential read pattern may be detected. Prefetching may be performed in response to detecting a sequential read pattern since it is likely that such sequential pattern of reading data may continue in subsequent not yet received read operations. In this manner, when retrieving the read data for LUN A, LBA 4-6 of the second read operation, additional data of the sequential pattern may also be prefetched beyond what is currently requested. For example, LUN A, LBA 7-8 may be prefetched even though such data has not been requested for a read operation. Such prefetching may be characterized as a predictive heuristic allowing for prefetching of data from the physical device prior to such data actually being requested. In this manner, the cache may be prepopulated with prefetched data (next expected sequential data in the detected pattern) prior to actually receiving the subsequent read request for the prefetched data in order to increase performance and reduce the response time for servicing requests. Thus, an embodiment in accordance with techniques herein may implement prefetching and may also detect a sequential read. For example, a sequential read pattern may be detected in connection with the read request for data 502 of PD 2 and prefetching may be performed, for example, by DA 3 using path 520. If prefetching is performed, an embodiment may store the prefetched data, along with the data 502, in cache 304b. The prefetched data may be the next sequential data in the detected sequential read pattern.

The foregoing is one example of when an embodiment may decide to cache read data such as described above as optional in connection with caching in 304b on path 520 or caching in 310a on path 522. More generally, an embodiment may use any suitable technique to determine whether and when to optionally cache the read data described above.

In foregoing examples and illustrations, a single QPI is illustrated between a pair of sockets in the same SP. For example, with reference to FIG. 7A, a single QPI, QPI 1, is illustrated between CPU sockets 306a and 308a of SP A 302a. However, it should be generally noted that one or more QPIs may exist between two CPU sockets. For example, an embodiment may have two QPIs between 306a and 308a and also two QPIs between 306b and 308b. In such an embodiment with multiple QPIs, the threshold criteria described above (e.g., MAX READ) may be applied collectively across both or all QPIs between the two CPU sockets (e.g., 306a, 308a) collectively. Alternatively, an embodiment may have separate criteria applied individually to each of the QPIs.

Figure 8:
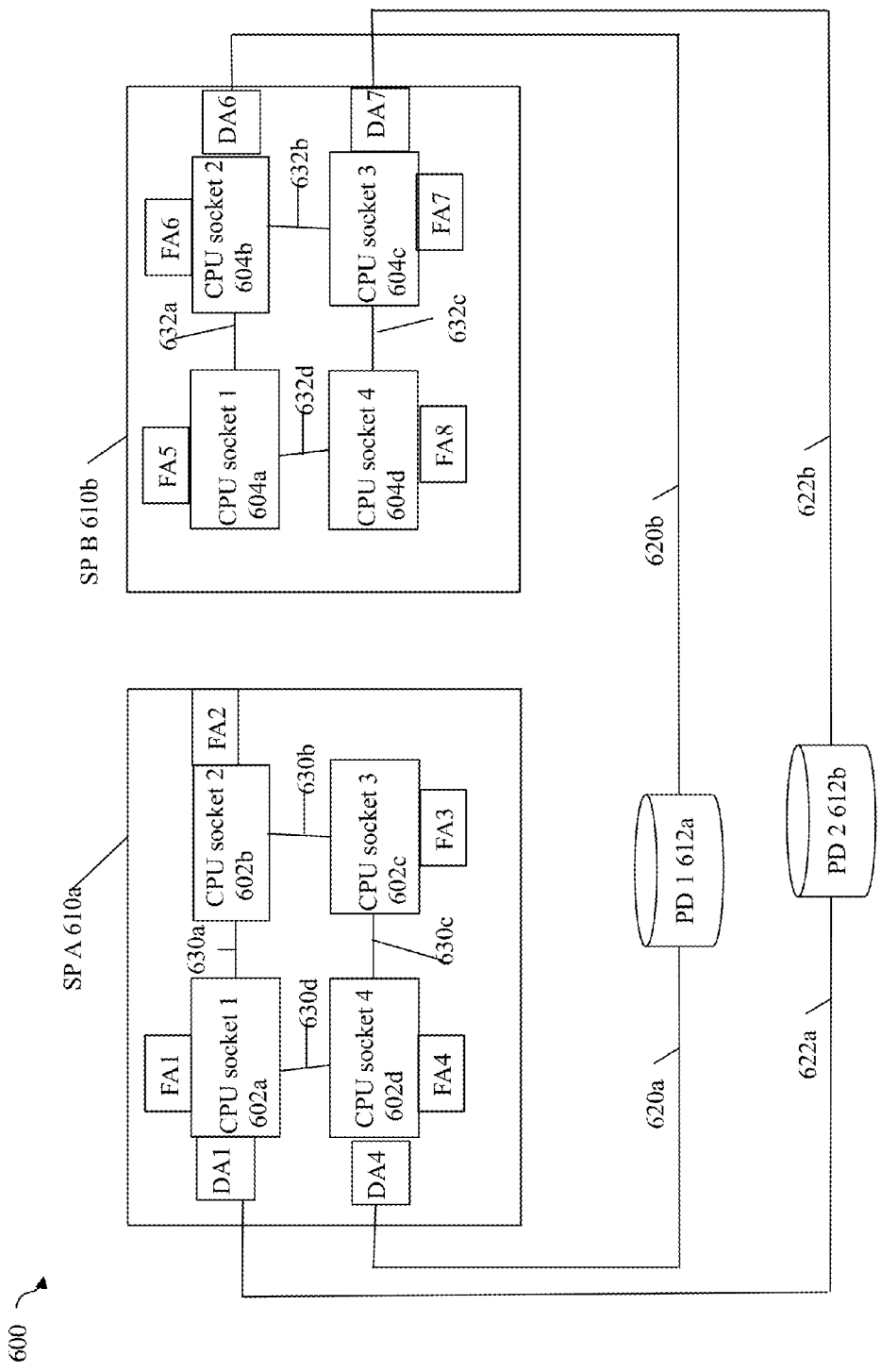

Referring to FIG. 8, shown is an example of an embodiment in accordance with techniques herein including 4 sockets per SP. The example 600 includes components as described elsewhere herein with other figures (e.g., FIG. 3C) that may be included in a data storage system, such as a data storage array. The example 600 includes two SPs—SP A 610a and SP B 610b, each with 4 CPU sockets, QPI connections 630a-d and 632a-d, and two PDs 612a, 612b. SP A 610a includes CPU sockets 602a-d. In one embodiment, each socket 602a-d may include components for a single NUMA domain. Each of the sockets 602a-d may be associated with a local memory module (not illustrated for simplicity), one or more local DAs and one or more local FAs included in the same NUMA domain such as described in connection with FIGS. 5, 5A, 6A and 7A. The omitted memory modules local to each of the sockets 602a-d and 604a-d may form the cache of each SP as described elsewhere herein. The example 600 illustrates an arrangement in which two QPIs are connected to each CPU socket so as to form a ring-like configuration or topology of sockets in each SP. Additionally, there is a CMI connecting each pair of corresponding sockets of the SPs A and B as described herein whereby such CMI connections have been omitted for simplicity. It should be noted that other components, such as a host, other FAs, DAs, and the like, may be included in the example 600 although such component are omitted for simplicity of illustration.

In such an arrangement, each PD may be connected to two CPU sockets whereby each of the two sockets are in different SPs and each of the two sockets are located at a position which is a diagonal with respect to the other socket in the other SP. Generally, each PD may be connected to two sockets each in a different SP and each either having a different even-numbered corresponding socket number, or each having a different odd-numbered corresponding socket number. For example, each PD may be connected to two sockets which are diagonals of one another in different SPs in the illustrated configuration. For example, through DA4, PD 1 612a may be connected to socket 4 602d of SP A, and through DA 6, PD 1 612a may also be connected to socket 2 604b of SP B. Additionally, through DA 1, PD 2 may be connected to socket 1 of SP A and through DA7, PD 2 may also be connected to socket 3 604c of SP B.

An embodiment may use the configuration of FIG. 8 in connection with performing both read and write operation processing as generally described herein. For example, a write operation to write data to PD1 612a may be received at FA2 of socket 2. In response to receiving the write operation, the write data may be cached in the memory local to socket 2 602b, and the write data may be mirrored to the corresponding memory cache local to socket 2 604b (of the peer SP B). Sometime later, the write data that is cached in memory local to both 602b and 604b may be destaged. In a manner similar to that as described above, for example, in connection with FIG. 6B, processing may be performed to determine which DA, cached data copy, and associated path between the memory module including the cached data copy and the DA, to utilize for destaging the cached data to physical storage. In this example, DA4 and DA6 are connected to PD 1 612a whereby a decision is made as to which DA, cached data copy and associated path to utilize in connection with destaging the cached data stored in memory local to the CPU socket pair 2—sockets 602b and 604b. As described herein, the DA, cached data copy and path selected may be that which avoids use of the QPIs or otherwise, more generally, includes the path (between the memory including the cached data and the DA) which traverses the least number of QPI connections (e.g., the path with the minimum number of QPI hops). In this example, if DA 4 is used with the cached data included in memory module local to 602b, QPI connections 630b and 630c are traversed to transfer the cached write data from memory local to 602b to DA4 (local to socket 4 602d). If DA 6 is used with the cached data included in memory module local to 604b, no QPI connections are traversed. In this case, DA6 and the associated cached data and path just described may be selected to destage the cached write data included in memory local to 604b.

In an embodiment including more than two PDs, each PD may be configured to have connections to two DAs in a manner similar to that as illustrated for 612a or 612b. It should be noted that the example 600 illustrates use of sockets 602a and 602d of SP A and 604b and 604c of SP B. Rather than connect PD1 612a to socket 4 602d of SP A and socket 2 604b of SP B, the other sockets of each of the socket pairs 2 and 4 may be utilized. For example, PD 1 612a may be alternatively connected to socket 4 604d of SP B and socket 2 602b of SP A. In such an alternative embodiment, rather than connect PD2 612b to socket 1 602a of SP A and socket 3 604c of SP B, the other sockets of each of the socket pairs 1 and 3 may be utilized. For example, PD 2 612b may be alternatively connected to socket 1 604a of SP B and socket 3 602c of SP A.

In such an arrangement and topology as described in connection with FIG. 8, at most 1 QPI connection is traversed to store any write pending cached data to physical storage. The embodiment of FIG. 8 may also be used in connection with processing read requests as described above.

Figure 8B:
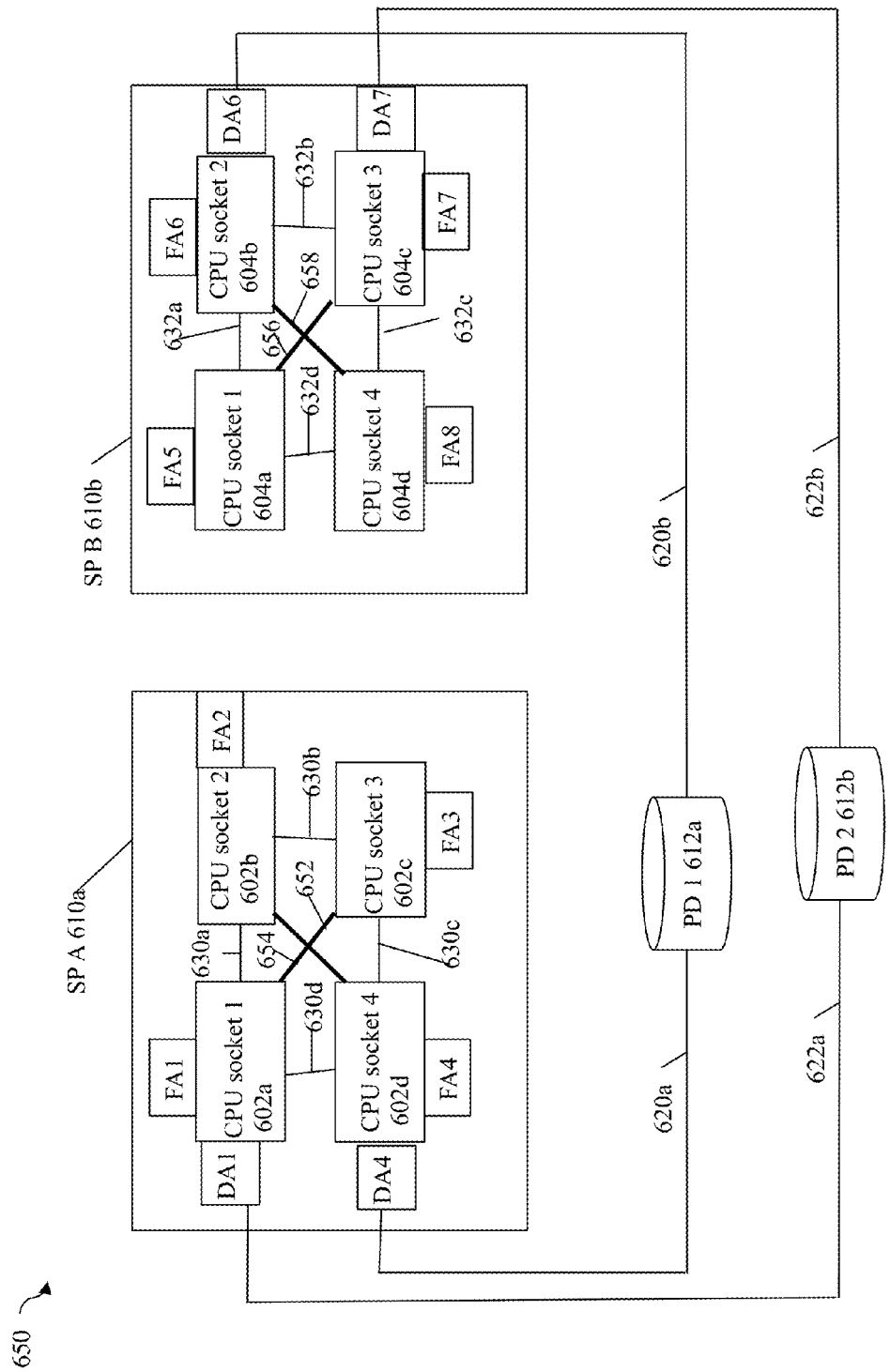

Referring to FIG. 8B, shown is another example of an embodiment in accordance with techniques herein including 4 sockets per SP. The example 650 includes components as described in connection with the example 600 of FIG. 8 with the difference of additional QPI connections 652, 654, 656 and 658 between various pairs of CPU sockets as illustrated. In the embodiment of 650, each socket has 3 QPIs in the connected arrangement. The embodiment of FIG. 8B may also be used in connection with processing write and read requests as described herein.

Figure 8C:
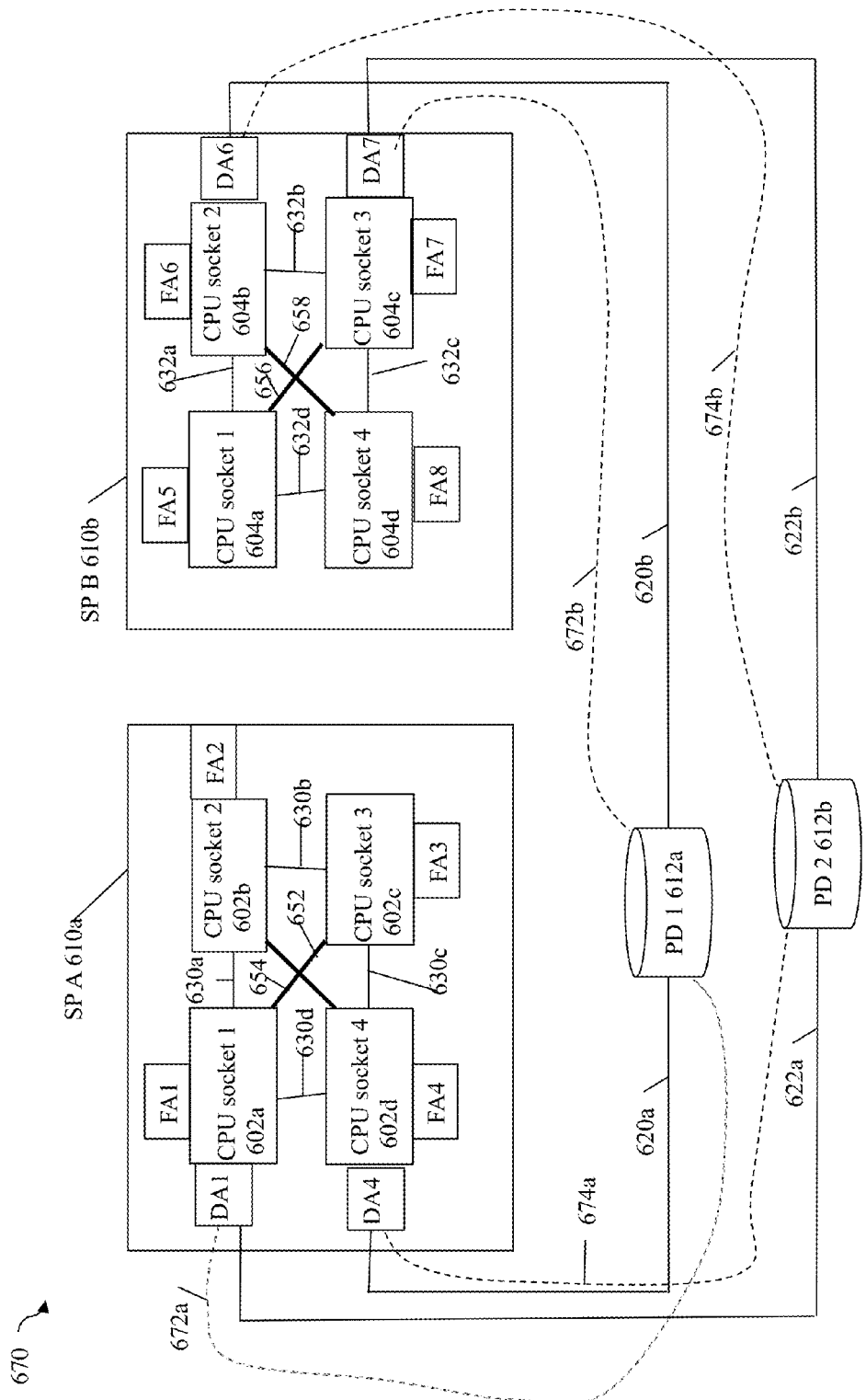

Referring to FIG. 8C, shown is another example of an embodiment in accordance with techniques herein including 4 sockets per SP. The example 670 includes components as described in connection with the example 650 of FIG. 8B with the difference of additional connections 672a-b and 674a-b between various DAs of CPU sockets and the PDs as illustrated. In the embodiment of FIG. 8C, each PD has a connection to 4 sockets where each of the 4 sockets is from a different one of the 4 socket pairs and where 2 of the 4 sockets are included in each of the two SPs. Generalizing FIG. 8C, if there are N sockets in total across both SPs, each PD is connected to N/2 connections CPU sockets (e.g., via DAs of such CPU sockets) of the different corresponding CPU socket pairs such as illustrated in 670. The embodiment of FIG. 8C may also be used in connection with processing write and read requests as described herein.

Figure 9A:
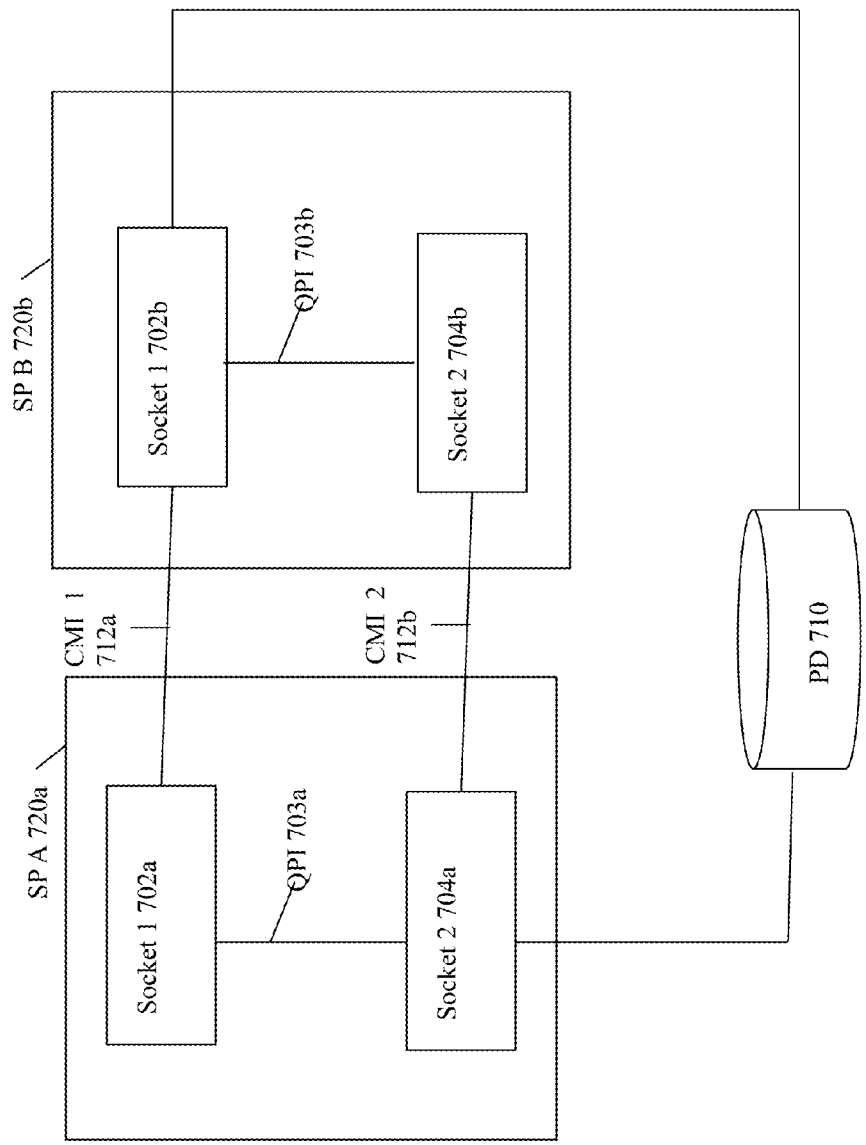

Referring to FIG. 9A, shown is an example 700 which generally represents the topology or arrangement described in connection with FIGS. 6A, 6B and 7A where each SP 720a, 720b includes two sockets. SP A 720a includes sockets 702a and 704a and SP B 720b includes sockets 702b and 704b. Each of the sockets 702a-b and 704a-b includes other associated local components (e.g., FAs, DAs, local memory modules, etc.) of the associated NUMA domain as described elsewhere herein whereby such components are omitted for simplicity of illustration. Also illustrated are QPIS 703*a-b*. As described above, each PD may be connected to a socket of each different corresponding socket pair in a different SP. For example, each PD may be connected to a first socket of the socket 1 pair 702*a*-702*b* in a first SP (e.g., SP A) and a second socket of the socket pair 2 704*a*-704*b* in the second SP (e.g., SP B). For example, PD 710 is connected to socket 702*a* of socket pair 1 located in SP A and also connected to socket 704*b* of socket pair 2 located in SP B. CMI 1 712*a* may connect sockets 702*a-b* of socket pair 1 and CMI 2 712*b* may connect sockets 704*a-b* of socket pair 2. As described herein, the CMI connections 712*a-b* are used for inter SP communications such as to mirror pending write cached data as described herein.

The embodiment of FIG. 9A may also be used in connection with processing write and read requests as described herein.

Figure 9B:
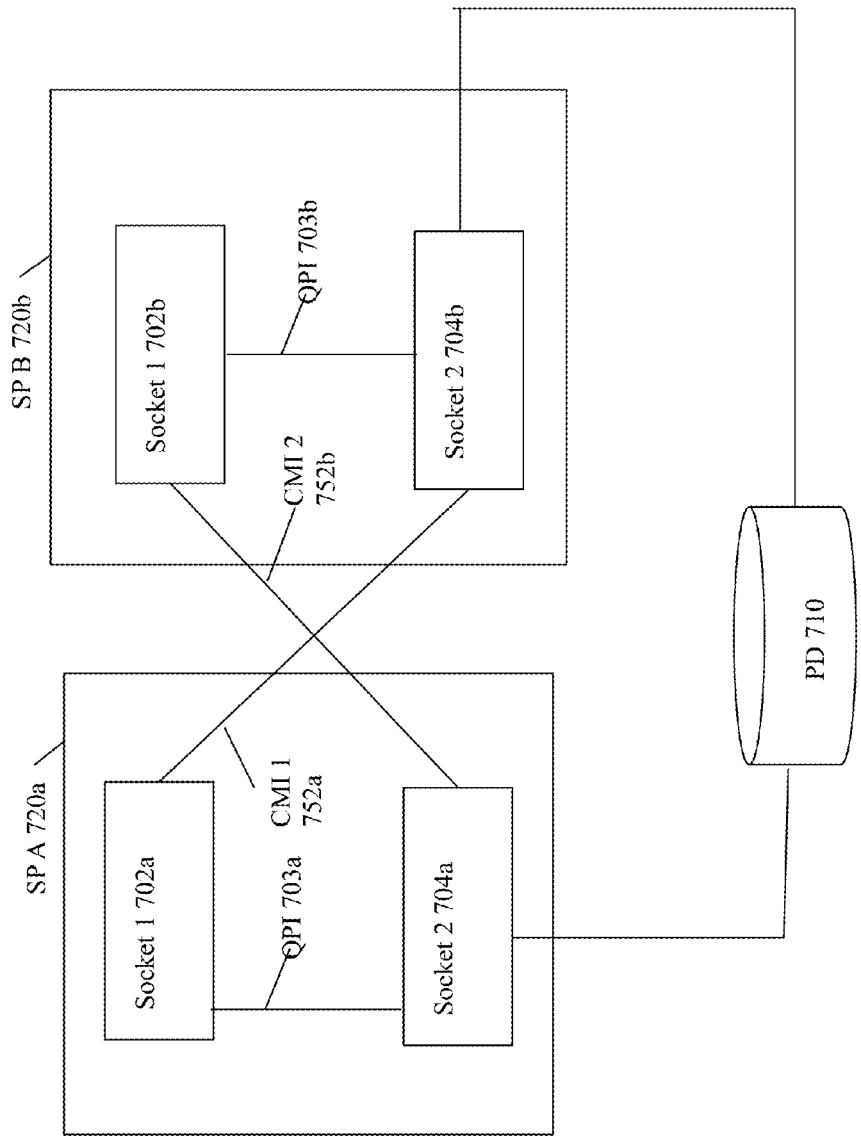

As a variation from that described in FIG. 9A, techniques described herein may be used in connection with a topology as illustrated in FIG. 9B. In the example 750, the PD 710 may alternatively be connected to each socket of the same socket pair (e.g., connected to both sockets 704*a-b* or connected to both sockets 702*a-b*). In the example 750, the CMI connections are connected to non-corresponding sockets of the different SPs. For example, CMI 1 752*a* connects socket 1 702*a* of SP A and socket 2 704*b* of SP B, and CMI 2 752*b* connects socket 1 704*a* of SP A and socket 1 702*b* of SP B. In such an arrangement, processing for write operations may be as described above. However, with the configuration of the example 750, the mirroring of the cached data between the SPs using the CMI causes the cached write data to be copied to the memory module of the non-corresponding socket pair in the other SP. For example, assume a write is received on an FA local to 702*a* where such write data is cached in the memory module also local to 702*a*. The cached write data of memory local to 702*a* is copied to a memory module local to socket 1 704*b*. Subsequently, a decision is made as to whether to use a DA local to 704*a* or 704*b* to destage the cached write data using either the copy local to 702*a* or the copy local to 704*b*. As described herein, the cached copy, DA and associated path (between the cached copy and the DA) used is the path that does not traverse or use a QPI. In this case, the cached write data local to 704*b* may be used and written out to PD 710. The alternative path would use the cached copy local to 702*a* which is transferred to 704*a* over QPI 703*a* whereby a DA local to 704*a* stores the data to PD 710.

It should be noted the topology of FIG. 9B may also be used in connection with read operation processing as described in connection with FIG. 7A above. For example, a read requiring data to be retrieved from PD 710 may be received at an FA of 702*a*. In accordance with techniques herein, data from PD 710 may be obtained over a first path using a DA of 704*a* whereby such data is transferred over QPI 703*a* to a memory module of the cache local to 702*a*. Such cached data of 702*a* may be returned by the FA of 702*a* to the host or other client that issued the read.

Data from PD 710 may be obtained over a second path using a DA of 704*b* whereby such data is transferred over CMI 1 752*a* to a memory module of the cache local to 702*a*. Such cached data of 702*a* may be returned by the FA of 702*a* to the host or other client that issued the read.

In accordance with techniques herein such as described in connection with FIG. 7A, a heuristic and associated criteria may be used select one of the foregoing two paths to obtain the requested read data from PD 710.

With reference back to FIG. 8, it should be noted that an embodiment may dynamically select one of the PDs 612*a* or 612*b* when writing data. For example, with reference to FIG. 8, assume that PD 612*a* and 612*b* of the example 600 are used to store data for a file system. When writing data to a file, it may be necessary to allocate additional storage for the file whereby such allocation may be performed as part of processing the file write operation once received at the data storage system. The allocation of additional physical storage may be made from either PD1 612*a* or PD 2 612*b* depending on which PD is connected to a DA in the same NUMA domain as the cached data (e.g. generally select the PD closest to a cached copy of the write pending data). More generally, such storage allocation may be made from a PD which is based on the locality or proximity between each cached copy of the write pending data and each PD. For example, assume a write to the file is received at FA2 of 602*b* (of SP A). The write data is cached in memory local to socket 2 602*b* and then mirrored to the other SP B via copying the write data to memory local to corresponding CPU socket 2 604*b* of SP B. Thus, there is a cached copy of the write pending data in memory local to each socket of the socket 2 pair (e.g., CPU sockets 602*b*, 604*b*). In this example, 602*b* does not include a local DA (e.g., in the same NUMA domain) which is connected to any PD. However, 604*b* does include a local DA6 which is connected to PD 1 612*a* and therefore storage may be allocated from PD 1 612*a* to store the cached write data for the file write operation.

Figure 10:
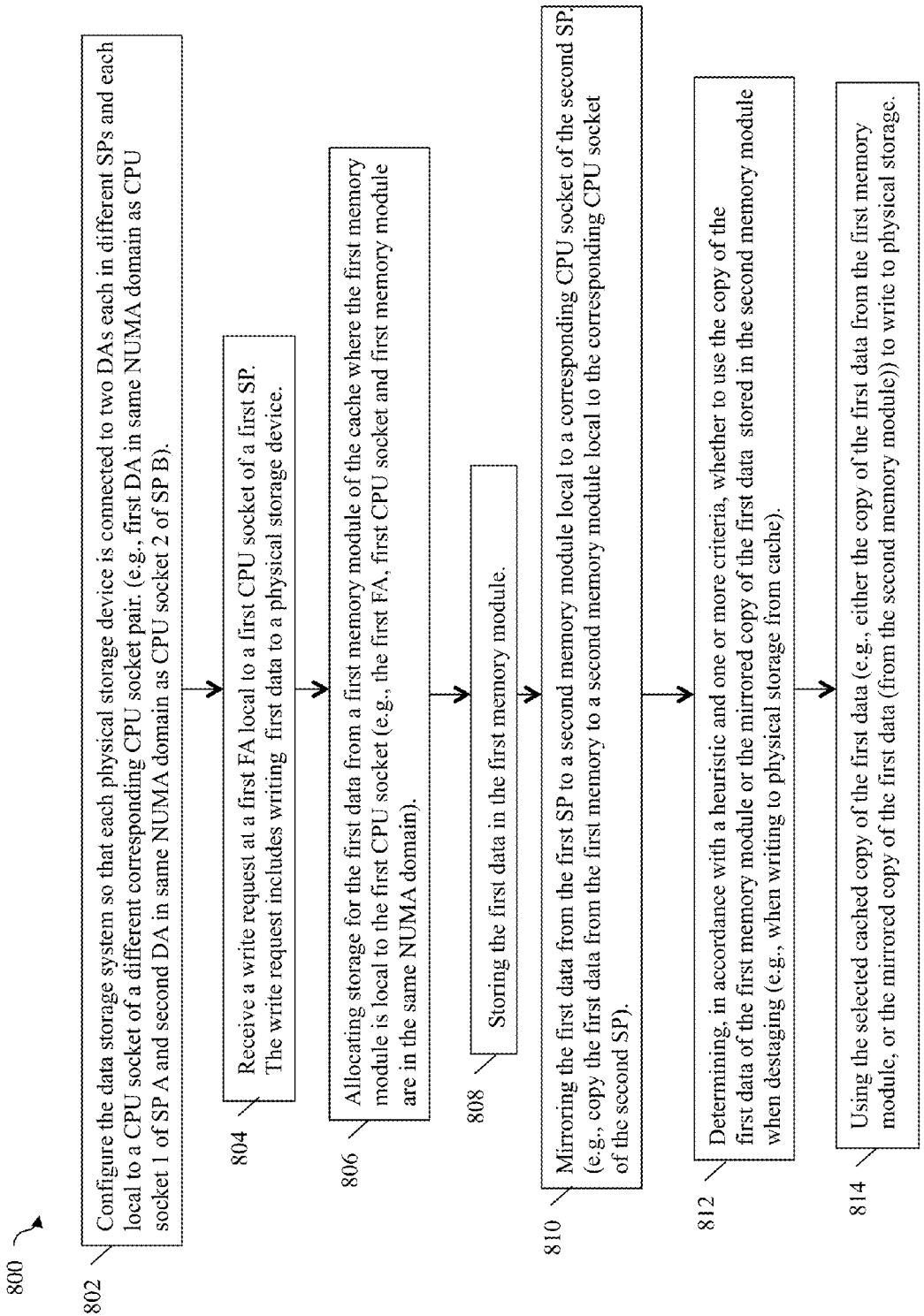
FIGS. 10 and 11 are flowcharts of processing steps that may be performed in an embodiment in accordance with techniques herein.

Referring to FIG. 10, shown is a flowchart of processing steps that may be performed in an embodiment in accordance with techniques herein. The flowchart 800 summarizes processing such as described above, such as in connection with FIGS. 6A and 6B, when performing a write operation. At step 802, the data storage system may be generally configured as described in connection with FIGS. 6A and 6B so that each physical storage device (PD) is connected to two DAs each in different SPs and each local to a CPU socket of a different corresponding CPU socket pair. (e.g., first DA in same NUMA domain as CPU socket 1 of SP A and second DA in same NUMA domain as CPU socket 2 of SP B). At step 804, a write request is received at a first FA local to a first CPU socket of a first SP. The write request includes writing first data to a physical storage device. At step 806, storage is allocated for the first data from a first memory module of the cache where the first memory module is local to the first CPU socket (e.g., the first FA, first CPU socket and first memory module are in the same NUMA domain). At step 808, the first data is cached or stored in the first memory module and may be marked as write pending data to be destaged or written out to physical storage at a later point in time. At step 810, processing is performed to mirror the first data from the first SP to a second memory modules local to a correspond CPU socket of the second SP (e.g., copy the first data from the first memory to a second memory module local to the corresponding CPU socket of the second SP. The CPU socket of the second SP having the second memory module and the first CPU socket at which the write request was received in step 804 are included in the same corresponding CPU socket pair). It should be noted that in some embodiments, an acknowledgement that the write operation has completed may be returned to the client after steps 808 and 810 have been successfully completed.

At step 812, processing is performed to determine, in accordance with a heuristic and one or more criteria, which cached copy of the first data (the write request data) to use when destaging or writing to physical storage. For example, step 812 may include determining whether to use the copy of the first data of the first memory module of the first SP, or the mirrored copy of the first data stored in the second memory module of the second SP. As described herein, criteria used to select the particular cached copy of the first data may include determining whether the particular cached copy can be destaged to physical storage without crossing or using a QPI. In accordance with techniques herein, the heuristic may be to select the particular cached copy of the first data which, during the destaging process to write the cached data to the physical device, does not cross or use a QPI (e.g. does not include transferring the cached data over a QPI to write the cached data to physical storage).

Although step 802 and FIG. 10 processing is described with reference to FIGS. 6A and 6B, it will be appreciated by those skilled in the art that an embodiment may configure the data storage system and associated physical devices in step 802 using any suitable configuration of the data storage system some of which are described herein. For example, the data storage system may be configured as described in connection with any of FIGS. 6A and 6B, FIG. 8, FIG. 8B, FIG. 8C, FIG. 9A and FIG. 9B. When using other configurations, the general processing for write operations may be as described herein.

It should be noted that the heuristic and associated criteria used in connection with performing step 812 for write pending data may be referred to as a first heuristic and first one or more criteria. As described herein such heuristic and criteria may be different than those used in connection with reading data from a physical storage device.

Figure 11:
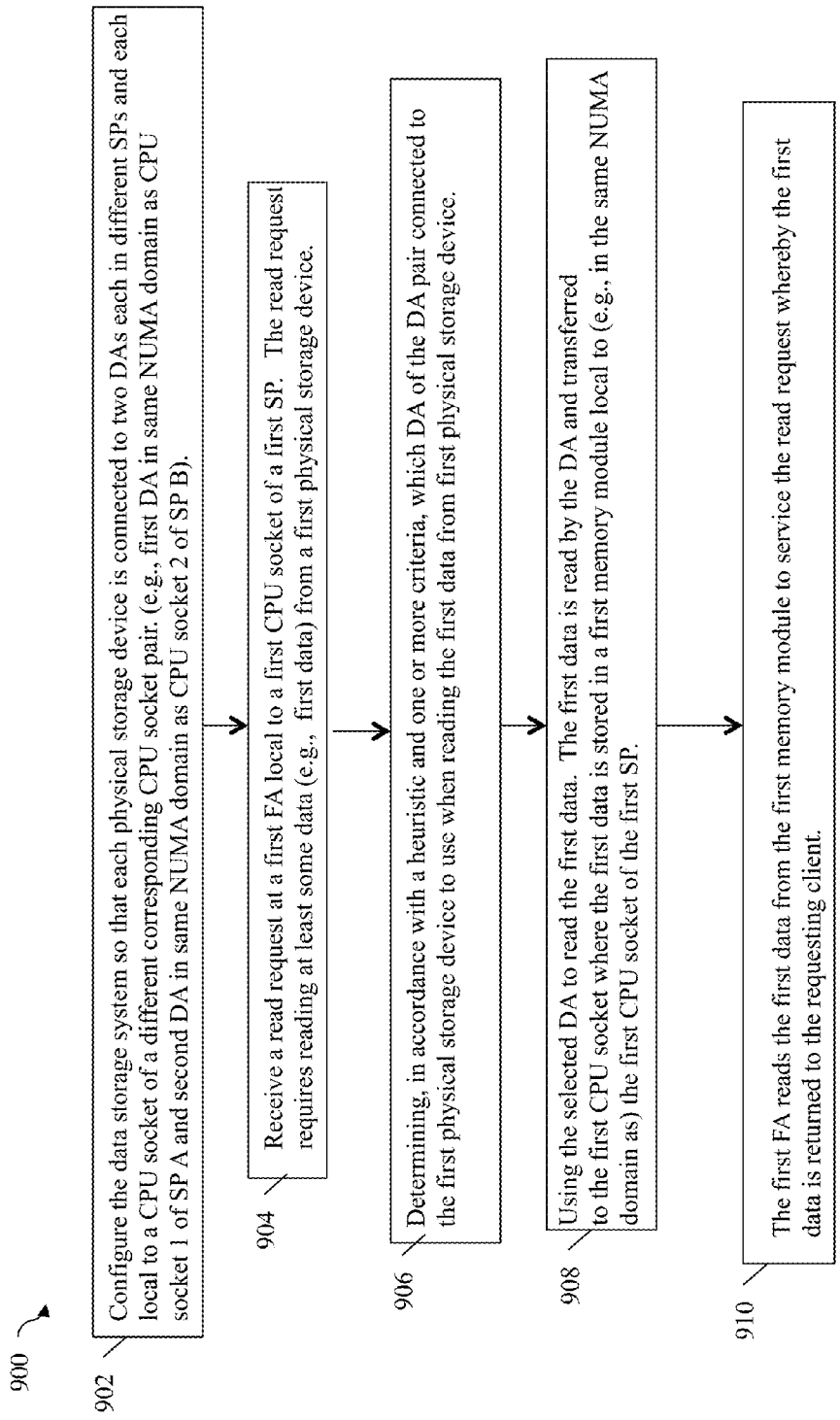

Referring to FIG. 11, shown is another flowchart of processing steps that may be performed in an embodiment in accordance with techniques herein. The flowchart 900 summarizes processing such as described above in connection with FIG. 7A when performing a read operation that is a read miss and requires obtaining data from physical storage to service the read. The flowchart 900 includes a first step 902 which is similar to step 802 as described above. At step 904, a read request is received at a first FA local to a first CPU socket of a first SP. The read request requires reading at least some data (e.g., first data) from a first physical storage device. At step 906, processing is performed to determine, in accordance with a heuristic and one or more criteria, which DA of the DA pair connected to the first physical storage device to use when reading the first data from first physical storage device. As described herein the heuristic may provide for selecting a particular DA based on current workload of such one or more interdomain (or intersocket) communication connections such as may be indicated by the criteria. The one or more criteria may include a maximum number of allowable outstanding read operations on one or more interdomain (or inter CPU socket) communication connections (e.g., QPIs). The heuristic and associated one or more criteria used in step 906 may also be referred to as a second heuristic and second one or more criteria.

At step 908, the selected DA is used to read the first data from the first physical storage device. The first data is read by the DA and transferred to the first CPU socket where the first data is stored in a first memory module local to (e.g., in the same NUMA domain as) the first CPU socket of the first SP. At step 910, the first FA reads the first data from the first memory module to service the read request whereby the first data is returned to the requesting client.

An embodiment may implement the techniques herein using code executed by a processor. For example, an embodiment may implement the techniques herein using code which is executed by a processor of a system, such as the data storage system, management system, or more generally, any computer system. As will be appreciated by those skilled in the art, the code may be stored on the data storage system on a computer-readable storage medium (also referred to as a computer readable medium) having any one of a variety of different forms including volatile and nonvolatile, removable and non-removable media implemented in any method or technology for storage of information such as computer readable instructions, data structures, program modules or other data. Computer-readable storage media (or computer readable media) includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing read and write requests comprising:
receiving a write request at a first front end adapter of a data storage system having main memory with a non-uniform memory access configuration, wherein the write request includes writing first data to a first storage device, the data storage system including a first storage processor and a second storage processor, the first storage processor comprising a first plurality of domains including a first domain and a second domain, the first domain including first components and a first memory of the main memory, the first components including the first front end adapter and a first device controller, wherein the first memory is local to the first domain and directly accessible to the first components, the second domain including second components and a second memory of the main memory, the second components including a second device controller, wherein the second memory is local to the second domain and directly accessible to the second components, the second storage processor comprising a second plurality of domains including a third domain and a fourth domain, the third domain including third components and a third memory of the main memory, the third components including a third device controller, wherein the third memory is local to the third domain and directly accessible to the third components, the fourth domain including fourth components and a fourth memory of the main memory, the fourth components including a fourth device controller wherein the fourth memory is local to the fourth domain and directly accessible to the fourth components, wherein a first inter-storage processor communication connection is a direct connection between a first pair of CPU sockets of the first storage processor and the second storage processor, the first pair of CPU sockets including a first CPU socket of the first domain of the first storage processor and a third CPU socket of the third domain of the second storage processor and allows communications directly therebetween including transferring data between the first memory of the first storage processor and the third memory of the second storage processor, wherein the first storage device is connected to a set of device controllers used to access the first storage device, the set of device controllers including either the second device controller and the third device controller or otherwise including the first device controller and the fourth device controller;

storing a first copy of the first data in the first memory local to the first domain;

using the first inter-storage processor communication connection, directly copying the first data from the first storage processor to the second storage processor whereby the first data is directly copied from the first memory of the first domain of the first storage processor to the third memory of the third domain of the second storage processor thereby creating a second copy of the first data in the third memory; and determining, in accordance with a first heuristic and first one or more criteria, whether to use the first copy of the first data stored in the first memory or the second copy of the first data stored in the third memory as a source when writing the first data to the first storage device.

2. The method of claim 1, wherein a second inter-storage processor communication connection is a direction connection between a second pair of CPU sockets of the first storage processor and the second storage processor, the second pair of CPU sockets including a second CPU socket of the second domain of the first storage processor and a fourth CPU socket of the fourth domain of the second storage processor and allows communications directly therebetween including transferring data between the second memory of the first storage processor and the fourth memory of the second storage processor, wherein the first storage processor includes a first interdomain communication connection, between the first domain and the second domain, is used by the first domain to access the second memory and by the second domain to access the first memory, wherein the second storage processor includes a second interdomain communication connection, between the third domain and the fourth domain, used by the third domain to access the fourth memory and by the fourth domain to access the third memory, and wherein the first components of the first domain include a first group of one or more CPUs, the second components of the second domain include a second group of one or more CPUs and a second front end adapter, the third components of the third domain include a third group of one or more CPUs and a third front end adapter, and the fourth components of the fourth domain include a fourth group of one or more CPUs and a fourth front end adapter.

3. The method of claim 2, wherein the set of device controllers includes the second device controller and the third device controller and does not include the first device controller and the fourth device controller and wherein said second copy of the third memory is used as the source, and the method comprises:

using the third device controller to write the second copy of the first data from the third memory to the first storage device.

4. The method of claim 2, wherein the set of device controllers includes the first device controller and the fourth device controller and does not include the second device controller and the third device controller and wherein the first copy of the first memory is used as the source and the method comprises:

using the fourth device controller to write the first copy of the first data from the first memory to the first storage device.

5. The method of claim 2, wherein said determining whether to use the first copy or the second copy of the first data uses the first one or more criteria that includes determining whether writing the first copy to the first storage device uses any of the first domain communication connection and the second interdomain communication connection.

6. The method of claim 5, wherein said determining uses the first heuristic that includes selecting the first copy to use as said source if none of the first interdomain communication connection and the second interdomain communication connection are used to write the first copy of data to the first storage device, and otherwise selecting the second copy, and wherein the method further comprises:

writing the first data to the first storage device using either the first copy or the second copy as selected by said selecting.

7. The method of claim 2, wherein said determining whether to use the first copy or the second copy of the first data uses the first one or more criteria that includes determining whether writing the second copy to the first storage device uses any of the first interdomain communication connection and the second interdomain communication connection.

8. The method of claim 7, wherein said determining uses the first heuristic that includes selecting the second copy to use as said source if none of the first interdomain communication connection and the second interdomain communication connection are used to write the second copy of data to the first storage device, and otherwise selecting the first copy, and wherein the method further comprises:

writing the first data to the first storage device using either the first copy or the second copy as selected by said selecting.

9. The method of claim 2, further comprising:

receiving a read request from a client at the first front end adapter, wherein processing for the read request includes reading second data from the first storage device;

selecting, in accordance with a second heuristic and second one or more criteria, one device controller of the set of device controllers to use when reading the second data from the first storage device;

reading the second data from the first storage device using the one device controller;

transferring the second data to the first domain whereby the second data is stored in the first memory; and sending, by the front end adapter, the second data in the first memory to the client.

10. The method of claim 9, wherein said selecting uses the second heuristic that selects the one device controller based on a current workload associated with any of the first interdomain communication connection and the second interdomain communication connection.

11. The method of claim 9, wherein said second one or more criteria includes a maximum number of allowable outstanding read operations on one or more interdomain communication connections.

12. The method of claim 2, wherein the first group of one or more CPUs, the second group of one or more CPUs, the third group of one or more CPUs and the fourth group of one or more CPUs are included, respectively, in the first CPU socket, the second CPU socket, the third CPU socket, and the fourth CPU socket.

13. The method of claim 12, wherein the first interdomain communication connection is a first intersocket communication connection and the second interdomain communication connection is a second intersocket communication connection.

14. The method of claim 12, wherein said first storage processor includes a first set of four CPU sockets and the second storage processor includes a second set of four CPU sockets, wherein each of the sockets in the first set and the second set includes a group of one or more CPUs connected to a memory portion of the main memory, a device controller and a front end adapter all local to said each socket in a non-uniform memory access configuration, wherein each of the four sockets in the first set is connected to each of the remaining three sockets of the first set by an intersocket communication connection and each of the four sockets in the second set is connected to each of the remaining three sockets of the second set by an intersocket communication connection, wherein there is an inter-storage processor communication connection between pairs of corresponding sockets whereby each of the pairs includes one socket of the first storage processor connected to another corresponding socket of the second storage processor.

15. A system comprising:
 a main memory having a non-uniform memory access (NUMA) configuration, said main memory comprising a first memory, a second memory, a third memory, and a fourth memory;
 a first storage processor including:
  a first CPU socket and a second CPU socket;
  the first memory connected to the first CPU socket and the second memory connected to the second CPU socket;
  a first front end adapter connected to the first CPU socket and a second front end adapter connected to the second CPU socket;
  a first device controller connected to the first CPU socket and a second device controller connected to the second CPU socket, wherein a first domain includes the first memory and first components comprising the first front end adapter, the first device controller and the first CPU socket whereby the first memory is local to the first domain and directly accessible to the first components, and wherein a second domain includes the second memory and second components comprising the second front end adapter, the second device controller and the second CPU socket whereby the second memory is local to the second domain and directly accessible to the second components; and
  a first intersocket communication connection between the first CPU socket and the second CPU socket configured to enable the first CPU socket to access the second memory and the second CPU socket to access the first memory;
 a second storage processor including:
  a third CPU socket and a fourth CPU socket;
  the third memory connected to the third CPU socket and the fourth memory connected to the fourth CPU socket;
  a third front end adapter connected to the third CPU socket and a fourth front end adapter connected to the fourth CPU socket;
  a third device controller connected to the third CPU socket and a fourth device controller connected to the fourth CPU socket, wherein a third domain includes the third memory and third components comprising the third front end adapter, the third device controller, and the third CPU socket whereby the third memory is local to the third domain and directly accessible to the third components, and wherein a fourth domain includes the fourth memory and fourth components comprising the fourth front end adapter, the fourth device controller, and the fourth CPU socket whereby the fourth memory is local to the fourth domain and directly accessible to the fourth components; and
  a second intersocket communication connection between the third CPU socket and the fourth CPU socket configured to enable the third CPU socket to access the fourth memory and the fourth CPU socket to access the second memory;
 a first inter-storage processor communication connection that is a direct connection between a first pair of CPU sockets of the first storage processor and the second storage processor, the first pair of CPU sockets including the first CPU socket and the third CPU socket, wherein the first inter-storage processor communication connection is configured to enable the first CPU socket of the first domain of the first storage processor and the third CPU socket of the third domain of the second storage processor to directly transfer data between the first memory of the first domain of the first storage processor and the third memory of the third domain of the second storage processor;
 a second inter-storage processor communication connection that is a direct connection between a second pair of CPU sockets of the first storage processor and the second storage processor, the second pair of CPU sockets including the second CPU socket and the fourth CPU socket, wherein the second inter-storage processor communication connection is configured to enable the second CPU socket of the second domain of the first storage processor and the fourth CPU socket of the fourth domain of the second storage processor to directly transfer data between the second memory of the second domain of the first processor and the fourth memory of the fourth domain of the second processor; and
 a storage device accessible through a set of device controllers, wherein said set of device controllers includes either the second device controller and the third device controller or includes the first device controller and the fourth device controller.

16. The system of claim 15, further comprising a non-transitory computer readable medium with code stored thereon that, when executed by a processor, performs a method comprising:
 receiving a write request at the first front end adapter;
 storing a first copy of the first data in the first memory local to the first CPU socket;
 copying, using the first inter-storage processor communication connection, the first data from the first memory of the first domain of the first storage processor to the third memory of the third domain of the second storage processor thereby creating a second copy of the first data in the third memory;
 determining, in accordance with a first heuristic and first one or more criteria, whether to use the first copy of the first data stored in the first memory or the second copy of the first data stored in the third memory as a source when writing the first data to the first storage device.

17. The system of claim 16, wherein said determining uses the first heuristic that includes selecting the first copy to use as said source if none of the first intersocket communication connection and the second intersocket communication connection are used to write the first copy of data to the first storage device, and otherwise selecting the second copy, and wherein the method further comprises:

writing the first data to the first storage device using either the first copy or the second copy as selected by said selecting.

18. The system of claim 16, wherein the set of device controllers includes the second device controller and the third device controller and does not include the first device controller and the fourth device controller and wherein said second copy of the third memory is used as the source, and the method comprises:
  using the third device controller to write the second copy of the first data from the third memory to the first storage device.

19. The system of claim 16, wherein the set of device controllers includes the first device controller and the fourth device controller and does not include the second device controller and the third device controller and wherein the first copy of the first memory is used as the source and the method comprises:
  using the fourth device controller to write the first copy of the first data from the first memory to the first storage device.

20. The system of claim 16, wherein the method further comprises:
  receiving a read request from a client at the first front end adapter, wherein processing for the read request includes reading second data from the first storage device;
  selecting, in accordance with a second heuristic and second one or more criteria, one device controller of the set of device controllers to use when reading the second data from the first storage device;
  reading the second data from the first storage device using the one device controller;
  transferring the second data to the first domain whereby the second data is stored in the first memory; and
  sending, by the front end adapter, the second data in the first memory to the client, and wherein said selecting selects the one device controller based on a current workload associated with any of the first intersocket communication connection and the second intersocket communication connection.

21. A non-transitory computer readable medium comprising code stored thereon that, when executed, performs a method of processing read and write requests comprising:
  receiving a write request at a first front end adapter of a data storage system having main memory with a non-uniform memory access configuration, wherein the write request includes writing first data to a first storage device, the data storage system including a first storage processor and a second storage processor, the first storage processor comprising a first plurality of domains including a first domain and a second domain, the first domain including first components and a first memory of the main memory, the first components including the first front end adapter and a first device controller, wherein the first memory is local to the first domain and directly accessible to the first components, the second domain including second components and a second memory of the main memory, the second components including a second device controller, wherein the second memory is local to the second domain and directly accessible to the second components, the second storage processor comprising a second plurality of domains including a third domain and a fourth domain, the third domain including third components and a third memory of the main memory, the third components including a third device controller, wherein the third memory is local to the third domain and directly accessible to the third components, the fourth domain including fourth components and a fourth memory of the main memory, the fourth components including a fourth device controller wherein the fourth memory is local to the fourth domain and directly accessible to the fourth components, wherein a first inter-storage processor communication connection is a direct connection between a first pair of CPU sockets of the first storage processor and the second storage processor, the first pair of CPU sockets including a first CPU socket of the first domain of the first storage processor and a third CPU socket of the third domain of the second storage processor and allows communications directly therebetween including transferring data between the first memory of the first storage processor and the third memory of the second storage processor, wherein the first storage device is connected to a set of device controllers used to access the first storage device, the set of device controllers including either the second device controller and the third device controller or otherwise including the first device controller and the fourth device controller;
  storing a first copy of the first data in the first memory local to the first domain;
  using the first inter-storage processor communication connection, directly copying the first data from the first storage processor to the second storage processor whereby the first data is directly copied from the first memory of the first domain of the first storage processor to the third memory of the third domain of the second storage processor thereby creating a second copy of the first data in the third memory; and
  determining, in accordance with a first heuristic and first one or more criteria, whether to use the first copy of the first data stored in the first memory or the second copy of the first data stored in the third memory as a source when writing the first data to the first storage device.

* * * * *